US011631010B1

(12) United States Patent
Redfern et al.

(10) Patent No.: US 11,631,010 B1
(45) Date of Patent: Apr. 18, 2023

(54) SYSTEM AND METHOD FOR USE WITH CONNECTED KITCHEN APPLIANCES

(71) Applicant: Adaptics Limited, Dublin (IE)

(72) Inventors: Tim Redfern, Dublin (IE); Ben Harris, Dublin (IE); Jack Phelan, Wicklow (IE); Nicolas Nicolov Nicolov, Sunnyvale, CA (US); Pablo Marti Gamboa, Zaragossa (ES)

(73) Assignee: ADAPTICS LIMITED, Dublin (IE)

( * ) Notice: Subject to any disclaimer, the term of this patent is extended or adjusted under 35 U.S.C. 154(b) by 927 days.

(21) Appl. No.: 16/389,894

(22) Filed: Apr. 19, 2019

Related U.S. Application Data

(60) Provisional application No. 62/788,880, filed on Jan. 6, 2019, provisional application No. 62/788,883, filed on Jan. 6, 2019.

(51) Int. Cl.
| | |
|---|---|
| *G06F 17/00* | (2019.01) |
| *G06F 7/00* | (2006.01) |
| *G06N 5/04* | (2023.01) |
| *G06N 20/00* | (2019.01) |
| *A47J 36/32* | (2006.01) |
| *G06F 16/9038* | (2019.01) |
| *G06F 16/901* | (2019.01) |

(52) U.S. Cl.
CPC .............. *G06N 5/04* (2013.01); *A47J 36/321* (2018.08); *G06F 16/9024* (2019.01); *G06F 16/9038* (2019.01); *G06N 20/00* (2019.01)

(58) Field of Classification Search
CPC ......... G06N 5/04; G06N 20/00; A47J 36/321; G06F 16/9038; G06F 16/9024

USPC .......................................................... 706/11
See application file for complete search history.

(56) References Cited

U.S. PATENT DOCUMENTS

| | | | |
|---|---|---|---|
| 6,587,739 B1 | 7/2003 | Abrams et al. | |
| 7,908,019 B2 | 3/2011 | Ebrom et al. | |
| 8,419,434 B2 | 4/2013 | Do et al. | |
| 8,816,628 B2 | 8/2014 | Nowlin et al. | |
| 8,829,365 B1 | 9/2014 | Wallace et al. | |
| 9,364,106 B1 | 6/2016 | Ortiz | |
| 9,495,360 B2 | 11/2016 | Bhatt et al. | |
| 9,518,744 B2 | 12/2016 | Heit et al. | |
| 9,572,361 B2 | 2/2017 | Bordin | |
| 9,870,550 B2 | 1/2018 | Byron et al. | |
| 9,971,737 B2 | 5/2018 | Pinel et al. | |
| 10,159,382 B2 | 12/2018 | Haase et al. | |

(Continued)

FOREIGN PATENT DOCUMENTS

| | | |
|---|---|---|
| CN | 102200307 | 9/2011 |
| DE | 202011051217 | 10/2011 |

(Continued)

OTHER PUBLICATIONS

R. Dale, Chapter 9 "Generating Recipes: An Overview of Epicure," Current Research in Natural Language Generation, ISBN 0-12-200735-2 (Academic press, 1990).

(Continued)

*Primary Examiner* — Pavan Mamillapalli

(57) ABSTRACT

The present application provides a system for use in a connected kitchen allowing a user to find and use traditional recipes as would be found in a recipe book but to have them automatically customized to their language, locality, dietary preferences and the appliances in their kitchen.

20 Claims, 31 Drawing Sheets

(56) References Cited

U.S. PATENT DOCUMENTS

| | | | |
|---|---|---|---|
| 10,177,931 B2 | 1/2019 | Luckhardt et al. | |
| 10,530,866 B2 | 1/2020 | Boyce et al. | |
| 10,692,491 B2 | 7/2020 | Sisodia et al. | |
| 10,839,151 B2 | 11/2020 | Rapaport | |
| 10,997,149 B2 | 5/2021 | Srinivasan Natesan et al. | |
| 11,201,935 B2 | 12/2021 | Ren et al. | |
| 2001/0039460 A1* | 11/2001 | Aisa | G05B 19/042 700/17 |
| 2002/0027175 A1* | 3/2002 | Capp | A47J 43/046 241/199.12 |
| 2002/0046060 A1* | 4/2002 | Hoskyns | G16H 70/20 705/2 |
| 2008/0105738 A1 | 5/2008 | Oldendorf et al. | |
| 2009/0164933 A1 | 6/2009 | Pederson et al. | |
| 2009/0259689 A1* | 10/2009 | Do | G09B 21/00 707/E17.096 |
| 2009/0327932 A1 | 12/2009 | Ebrom et al. | |
| 2009/0327998 A1* | 12/2009 | McCoy | G06F 8/10 717/113 |
| 2010/0184479 A1 | 7/2010 | Griffin | |
| 2010/0198605 A1* | 8/2010 | Saulet | G16H 20/60 707/802 |
| 2010/0236839 A1 | 9/2010 | Bergh et al. | |
| 2010/0299074 A1 | 11/2010 | Chang et al. | |
| 2011/0167100 A1 | 7/2011 | Brodowski | |
| 2011/0289044 A1* | 11/2011 | Harrison | G06N 5/04 706/52 |
| 2012/0150681 A1* | 6/2012 | Yu | G06Q 30/0627 705/26.7 |
| 2012/0183934 A1 | 7/2012 | Södersten et al. | |
| 2012/0265348 A1* | 10/2012 | Kim | F25D 29/00 700/275 |
| 2013/0092032 A1 | 4/2013 | Cafferty et al. | |
| 2013/0101709 A1 | 4/2013 | Rader | |
| 2013/0149675 A1* | 6/2013 | Slone | A47J 36/321 434/127 |
| 2013/0149676 A1* | 6/2013 | Tokuda | A47J 36/321 434/127 |
| 2013/0149679 A1* | 6/2013 | Tokuda | A47J 36/321 434/127 |
| 2014/0170275 A1 | 6/2014 | Bordin | |
| 2014/0272026 A1 | 9/2014 | Wallace et al. | |
| 2015/0164282 A1 | 6/2015 | Haase et al. | |
| 2015/0290795 A1* | 10/2015 | Oleynik | B25J 9/0081 700/257 |
| 2015/0305564 A1 | 10/2015 | Jimenez et al. | |
| 2016/0048720 A1 | 2/2016 | Palmer et al. | |
| 2016/0138962 A1 | 5/2016 | Cartwright | |
| 2016/0235239 A1 | 8/2016 | Patadia | |
| 2016/0241653 A1 | 8/2016 | Ciepiel | |
| 2016/0253922 A1* | 9/2016 | Kremen | G09B 19/0092 434/127 |
| 2016/0278563 A1 | 9/2016 | Choudhary | |
| 2016/0299000 A1 | 10/2016 | Arai et al. | |
| 2017/0003161 A1 | 1/2017 | Moser | |
| 2019/0053332 A1 | 2/2019 | Cheng et al. | |
| 2019/0370883 A1* | 12/2019 | Koetz | A47J 43/00 |
| 2020/0383520 A1 | 12/2020 | Aboujassoum et al. | |
| 2021/0043108 A1 | 2/2021 | Baumback et al. | |
| 2021/0265036 A1 | 8/2021 | Lynn et al. | |
| 2022/0034514 A1 | 2/2022 | Heit et al. | |

FOREIGN PATENT DOCUMENTS

| | | |
|---|---|---|
| DE | 202013101483 | 6/2013 |
| DE | 102014104442 | 1/2015 |
| DE | 202015105998 | 1/2016 |
| DE | 102014110893 | 2/2016 |
| DE | 102014110866 | 4/2016 |
| DE | 102015103380 | 9/2016 |
| EP | 1239268 | 11/2002 |
| EP | 1605730 | 12/2005 |
| EP | 2901903 | 8/2015 |
| EP | 3357008 | 8/2018 |
| ES | 2525765 | 12/2014 |
| FR | 2994738 | 2/2014 |
| FR | 2994737 | 8/2014 |
| GB | 2397657 | 7/2004 |
| GB | 2525403 | 10/2015 |
| JP | 2002310431 | 10/2002 |
| KR | 102052408 | 8/2019 |
| KR | 102052409 | 8/2019 |
| KR | 20190100525 | 8/2019 |
| WO | 2008074582 | 6/2008 |
| WO | 2011089317 | 7/2011 |
| WO | 2012019886 | 2/2012 |
| WO | 2012174595 | 12/2012 |
| WO | 2013134275 | 12/2013 |
| WO | 14147379 | 9/2014 |
| WO | 15135031 | 9/2015 |
| WO | 16140623 | 9/2016 |
| WO | 2017055232 | 4/2017 |

OTHER PUBLICATIONS https://web.archive.org/web/20171222115819/https://www.getdrop.com/ (Cached on Dec. 22, 2017.).

\* cited by examiner

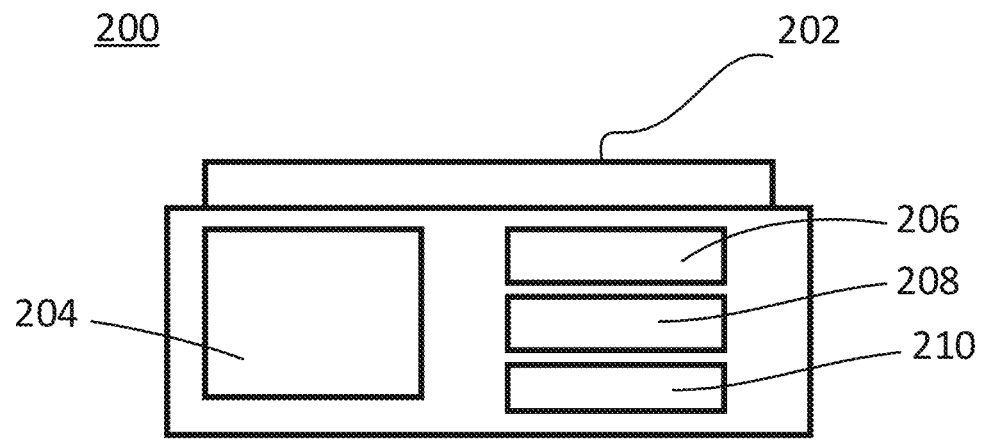
PRIOR ART    FIG. 2
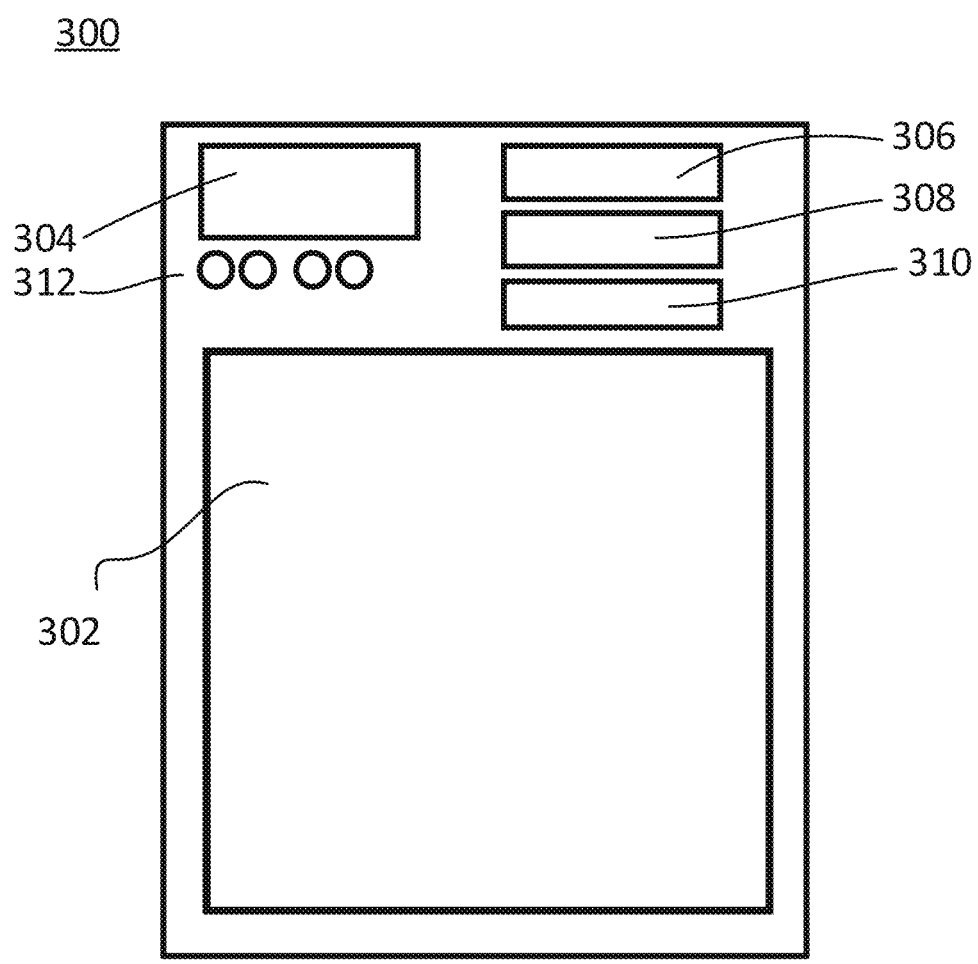
PRIOR ART    FIG. 3

700

| | |
|---|---|
| Edit agave syrup | |
| Name | agave syrup |
| Description | Ingredient description |
| Calories | 2.7 |
| Density | 1.5 |
| Scalable | ☑ |
| Liquid | ☐ |
| Unit weight | Average unit weight in grams |
| Scaling exponent | 1.0 |
| Tags | afternoon tea (occasions)<br>Autumn (occasions)<br>baby food (meals)<br>bbq (occasions) |
| Color | #dd6110 |
| Image | Browse |

SUBMIT

Abstract recipe

1100

| recipe | |
|---|---|
| id | 67 |
| created_at | 1412244580 |
| updated_at | 1539085384 |
| name_translations | HSTORE |
| slug_translations | HSTORE |
| instroduction_translations | HSTORE |
| user_id | 1651 |
| difficulty | 2 |
| times | JSON |
| rating | 4.72727 |
| servings | 6 |
| makes | 1 |
| source_url | VARCHAR |
| image_id | INTEGER |
| time | 3300 |
| favorites_count | 259 |
| ingredients_count | 12 |
| reviews_count | 7 |
| likes_count | 0 |
| acl | JSONB |
| locale | VARCHAR |
| yield_term_id | 418 |
| flagged_at | TIMESTAMP |
| comments_count | INTEGER |
| ratings_count | INTEGER |
| flagged_reason | VARCHAR |
| completion_caption_translations | HSTORE |
| parent_id | INTEGER |
| organization_id | INTEGER |
| locale_metadata_translations | JSON |
| max_ratio | 5.0 |
| min_ratio | 0.2 |
| s3_object_id | UUID |

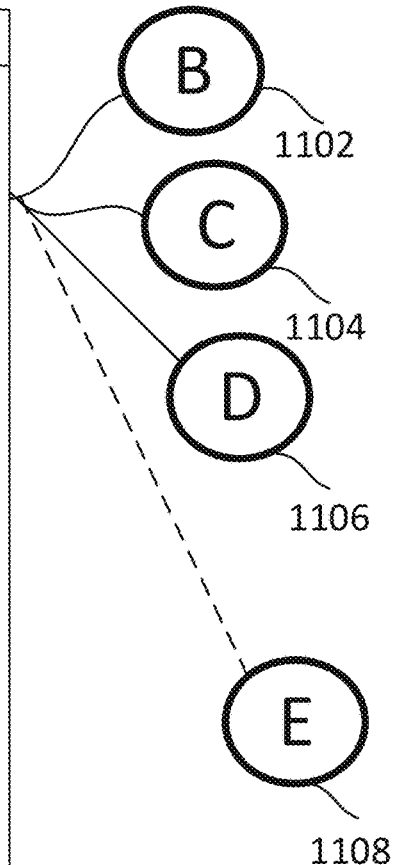

| step 2 | |
|---|---|
| id | 1090 |
| recipe_id | 67 |
| type | "bowl" |
| position | 2 |
| action_id | 517 |
| adverb_id | NULL |
| preparation_id | NULL |
| setting_id | NULL |
| until1_id | NULL |
| caption_translations | HSTORE |
| ingredient_id | NULL |
| from_container | UUID |
| to_container | 15a7ca |
| amount | 2 |
| units | NULL |
| time | NULL |
| temperature_id | NULL |
| grams | NULL |
| action2_id | NONE |
| preparation2_id | NONE |
| preparation3_id | NONE |
| until2_id | NONE |
| locale | VARCHAR |
| flags | JSONB |
| appliance_id | NULL |
| attachment_id | NULL |
| locale_metadata_translations | JSON |
| direct_object_id | INTEGER |
| direct_object_type | VARCHAR |

1104

| term "Get" | |
|---|---|
| id | 517 |
| name_translations | HSTORE |
| preposition_translations | HSTORE |
| type | action |
| locale | VARCHAR |
| locale_metadata_translations | JSON |

| container "large mixing bowl" | |
|---|---|
| id | 15a7ca |
| name_translations | HSTORE |
| needed | True |
| type | bowl |
| locale | VARCHAR |

| step 3 | |
|---|---|
| id | 1090 |
| recipe_id | 67 |
| type | "ingredient" |
| position | 3 |
| action_id | 1 |
| adverb_id | NULL |
| preparation_id | NULL |
| setting_id | NULL |
| until1_id | NULL |
| caption_translations | HSTORE |
| ingredient_id | 187 |
| from_container | UUID |
| to_container | 15a7ca |
| amount | NULL |
| units | NULL |
| time | NULL |
| temperature_id | NULL |
| grams | NULL |
| action2_id | NONE |
| preparation2_id | NONE |
| preparation3_id | NONE |
| until2_id | NONE |
| locale | VARCHAR |
| flags | JSONB |
| appliance_id | NULL |
| attachment_id | NULL |
| locale_metadata_translations | JSON |
| direct_object_id | INTEGER |
| direct_object_type | VARCHAR |

| term "Add" | |
|---|---|
| id | 1 |
| name_translations | HSTORE |
| preposition_translations | HSTORE |
| type | action |
| locale | VARCHAR |
| locale_metadata_translations | JSON |

| Ingredient "tomato" | |
|---|---|
| id | 187 |
| name_translations | HSTORE |
| desciption_translations | HSTORE |
| color | VARCHAR |
| calories | NUMERIC |
| density | NUMERIC |
| variance | NUMERIC |
| waste | NUMERIC |
| unit_weight | 140.0 |
| scaling_exponent | 1.0 |
| scalable | True |
| image_id | INTEGER |
| user_id | INTEGER |
| acl | JSONB |

| container "large mixing bowl" | |
|---|---|
| id | 1 |
| name_translations | HSTORE |
| needed | True |
| type | bowl |
| locale | VARCHAR |

| step | |
|---|---|
| id | INTEGER |
| recipe_id | INTEGER |
| type | VARCHAR |
| position | SMALLINT |
| action_id | INTEGER |
| adverb_id | INTEGER |
| preparation_id | INTEGER |
| setting_id | INTEGER |
| until1_id | INTEGER |
| caption_translations | HSTORE |
| ingredient_id | INTEGER |
| from_container | UUID |
| to_container | UUID |
| amount | REAL |
| units | VARCHAR |
| time | INTEGER |
| temperature_id | INTEGER |
| grams | Type |
| action2_id | INTEGER |
| preparation2_id | INTEGER |
| preparation3_id | INTEGER |
| until2_id | INTEGER |
| locale | VARCHAR |
| flags | JSONB |
| appliance_id | INTEGER |
| attachment_id | INTEGER |
| locale_metadata_translations | JSON |
| direct_object_id | INTEGER |
| direct_object_type | VARCHAR |

FIG. 11E

Functional recipe

```
{'appliances': [{'category': None,
        'id': 25,
        'manufacturer': None,
        'name': 'Food processor',
        'type': 'dummy'},
       {'category': 'Oven',
        'id':173,
        'manufacturer': {'id': 2,
                 'name': 'Bosch'},
        'name': 'Bosch oven, with Home Connect',
        'type': 'smart'}],
 'containers': [{'id': 6,
        'name': 'Large mixing bowl'},
       {'id': 92,
        'name': "Frying pan"},
       {'id': 72,
        'name': "Large saucepan"},
       {'id': 511,
        'name': 'Medium roasting dish'}],
 'ingredients': [{'grams': 1050.0,
        'id': 187,
        'name': 'Tomato'},
       {'grams': 6.0,
        'id': 108,
        'name': 'Fresh rosemary'},
       {'grams': 6.0,
        'id': 245,
        'name': "Fresh sage"},
       {'grams': 56,
        'id': 282,
        'name': 'Garlic clove'},
       {'grams': 38.0,
        'id': 155,
        'name': 'Olive oil'}],
 'introduction': 'This rich tomato soup is made with sweet roasted garlic and fresh herbs. Rainy day food at its best!',
 'locale': 'en_US',
 'name': 'Roasted Tomato Soup',
 'nutrition': {'recipe_servings': '7people',
        'recipe_yield': '1 soup',
        'serving_calories': 159,
        'serving_size': 373,
        'servings': 7,
        'total_calories': 1142,
        'total_weight': 2686,
        'yield': 1},
```

Inserted: oven (pointing to 'category': 'Oven' entry)

Scaled: +16.7% (bracketing the ingredients list)

FIG. 16A

```
'steps': [{'action': 'Pre-heat',
    'amount': None,
    'appliance': {'category': 'Oven',
            'id': 173,
            'manufacturer': {'id': 2,
                    'name': 'Bosch'},
            'name': 'Bosch oven, with Home Connect',
            'type': 'smart',},
    'id': 1089,
    'sentence': 'Pre-heat',
    'temperature': {'c': 175,
            'f': 350,
            'name': None,
            'url': '/api/v1/temperatures/5'}},
{'action': 'Get',
 'id': 1090,
 'sentence': 'Get a clean large mixing bowl',
 'to_container': 6,
 'type': 'bowl'}
{'action': 'Add',
 'amount': 1080.0,
 'id': 1091,
 'ingredient': {'id': 187,
        'name': 'tomato'},
 'preparation': 'whole unpeeled',
 'quantity_approx': 'about 7',
 'sentence': 'Add whole unpeeled tomato',
 'to_contaner': 6,
 'type': 'ingredient'},
```

← Inserted: oven

FIG. 16B

SYSTEM AND METHOD FOR USE WITH CONNECTED KITCHEN APPLIANCES

CROSS-REFERENCE TO RELATED APPLICATION

This non-provisional patent application claims priority under 35 U.S.C. § 119(e) to U.S. Provisional Patent application, Ser. No. 62/788,880, filed Jan. 6, 2019, and U.S. Provisional Patent application, Ser. No. 62/788,883, filed Jan. 6, 2019, the disclosures of which are incorporated by reference.

FIELD

The present application relates broadly to improving user experience in the kitchen, and in particular to a system and method for use with connected kitchen appliances.

BACKGROUND

Cooking is a necessity for many people but for others it is a pleasurable pursuit where people delight in learning how to cook recipes which are new to them.

Conventional approaches to sharing recipes and cooking rely upon recipes which are still in the form as they might be presented in a physical cookery book and thus static in nature.

At the same time, modern day appliances in a kitchen are increasingly becoming connectable to the internet allowing for users to control their appliances from a remote computing device such as a laptop or mobile phone. Accordingly, there is a need for a dynamic way to interact with the connected kitchen appliances.

SUMMARY

The present application provides a method and system which provides a dynamic approach to recipe generation that is customizable to users and which allows the integration of connected appliances into the cooking process, enabling guided cooking.

In one embodiment, a system for use with connected kitchen appliances is provided. The system includes: an ingredient database storing information for a plurality of ingredients and identifying each ingredient with a unique ingredient identifier; an action database storing a plurality of actions performable by at least one of a user or a cooking appliance and identifying each action with a unique action identifier; an appliance database storing information for a plurality of connected and non-connected kitchen appliances, and identifying each appliance with a unique appliance identifier, the appliance database further associating each kitchen appliance with one or more of the action identifiers from the action database, each associated action identifier identifying the action for which the kitchen appliance may be used; an ingestion engine configured to receive a user comprehensible recipe and convert the recipe into an associated abstract recipe, the associated abstract recipe comprising an ingredients list in which each ingredient is identified by that ingredient's associated ingredient identifier from the ingredient database and attributed a quantity, and a recipe sequence, wherein the recipe sequence identifies individual steps in the user comprehensible recipe, wherein each step in the sequence is associated with the action identifier from the action database identifying one or more of an action to be performed in the individual step, an ingredient id with an associated measure for the step, container ids, appliance id with associated appliance parameters or at least one of multimedia data and virtual reality data to illustrate the performance of the current cooking action; a recipe database storing a reference to the user comprehensible recipe and the associated abstract recipe; a user interface providing a graphical user interface allowing a user to select a recommended recipe from the recipes stored in the recipe database, or to select a recipe from search results after performing a recipe search against the recipe database with appropriate search criteria, and to provide a desired output measure; a transformation engine responsive to the user selection of a recipe, the transformation engine retrieving the associated abstract recipe as an input, the transformation engine using the desired output measure to scale the associated measure for each ingredient, comparing the action identifiers of the abstract recipe with action identifiers for appliances to identify appliances which may be employed in individual steps of the sequence, and employing the scaled ingredients and one or more selected appliances to transform the abstract recipe into a functional recipe which details the ingredients by their ingredient id and scaled associated measure and a sequence of steps to be followed including associating as required one or more selected appliances with one or more individual steps in the sequence; and a tangible recipe generation engine accepting the functional recipe and converting the functional recipe into a tangible recipe including a user comprehendible list of ingredients with appropriate measures for the user, the tangible recipe including a user comprehendible series of sequential steps, wherein the tangible recipe is presented on the user interface.

In a further embodiment, a non-transitory computer readable storage medium is provided. The non-transitory computer readable storage medium includes instructions that, when executed, cause at least one processor to at least: store information for a plurality of ingredients and identifying each ingredient with a unique ingredient identifier in an ingredients database; store a plurality of actions performable by at least one of a user or a cooking appliance and identifying each action with a unique action identifier in an action database; store information for a plurality of connected and non-connected kitchen appliances, and identifying each appliance with a unique appliance identifier in an appliance database; associating each kitchen appliance with one or more of the action identifiers from the action database in the appliance database, each associated action identifier identifying an action for which the kitchen appliance may be used; receiving a user comprehensible recipe and converting the user comprehensible recipe into an associated abstract recipe, the associated abstract recipe comprising an ingredients list in which each ingredient is identified by its associated ingredient identifier from the ingredient database and attributed a quantity, and a recipe sequence, wherein the recipe sequence identifies individual steps in the user comprehensible recipe, wherein each step in the sequence is associated with an action identifier from the action database identifying one or more of an action to be performed in the individual step, an ingredient id with an associated measure for the step, container ids, appliance id with associated appliance parameters, and at least one of multimedia and virtual reality data that illustrate the performance of the current cooking action; storing a reference to the user comprehensible recipe and the associated abstract recipe in a recipe database; providing a graphical user interface to allow a user to select a recommended recipe from the recipes stored in the recipe database or to select a recipe from search results after performing a recipe search against the recipe database with appropriate search criteria; receive the selection of a recipe from the user; receive a desired output measure from the user; retrieve in response to the received selection of a recipe by a user the associated abstract recipe as an input; use the received desired output measure to scale the associated measure for each ingredient; compare the action identifiers of the abstract recipe with action identifiers for appliances to identify appliances which may be employed in individual steps of the sequence; employing the scaled ingredients and one or more selected appliances to transform the abstract recipe into a functional recipe which details the ingredients by their ingredient id and scaled associated measure and a sequence of steps to be followed including associating as required one or more selected appliances with one or more individual steps in the sequence; and converting the functional recipe into a tangible recipe including a user comprehendible list of ingredients with appropriate measures for the user, the tangible recipe including a user comprehendible series of sequential steps, wherein the tangible recipe is presented on the user interface.

In a still further embodiment, a client server arrangement including a server and a client device for use with connected kitchen appliances. The server includes an ingredient database, storing information for a plurality of ingredients and identifying each ingredient with a unique ingredient identifier; an action database storing a plurality of actions performable by least one of a user or a cooking appliance and identifying each action with a unique action identifier; an appliance database storing information for a plurality of connected and non-connected kitchen appliances, and identifying each appliance with a unique appliance identifier, the appliance database also associating each kitchen appliance with one or more action identifiers from the action database, each associated action identifier identifying the action for which the kitchen appliance may be used; an ingestion engine for receiving a user comprehensible recipe and converting the user comprehensible recipe into an associated abstract recipe, the associated abstract recipe comprising an ingredients list in which each ingredient is identified by its associated ingredient identifier from the ingredient database and attributed a quantity, and a recipe sequence, wherein the recipe sequence identifies individual steps in the user comprehensible recipe, wherein each step in the sequence is associated with the action identifier from the action database identifying the action to be performed in the individual step; a recipe database storing a reference to the user comprehensible recipe and the associated abstract recipe. The client device includes a user interface providing a graphical user interface allowing a user to at least one of select a recommended recipe from the recipes stored in the recipe database, or to select a recipe from search results after performing a recipe search against the recipe database with appropriate search criteria, and to provide a desired output measure; a transformation engine responsive to the user selection of a recipe, the transformation engine retrieving the associated abstract recipe from the server as an input, the transformation engine using the desired output measure to scale the associated measure for each ingredient, comparing the action identifiers of the abstract recipe with action identifiers for appliances to identify appliances which may be employed in individual steps of the sequence, and employing the scaled ingredients and one or more selected appliances to transform the abstract recipe into a functional recipe which details the ingredients by their ingredient id and scaled associated measure and a sequence of steps to be followed including associating as required one or more selected appliances with one or more individual steps in the sequence; and a tangible recipe generation engine accepting the functional recipe and converting the functional recipe into a tangible recipe including a user comprehendible list of ingredients with appropriate measures for the user, the tangible recipe including a user comprehendible series of sequential steps, wherein the tangible recipe generation engine is configured to present the tangible recipe on the user interface.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

The present application will now be described in association with the accompanying drawings in which:

FIG. 2 is an example of a connected kitchen appliance suitable for use with the system of FIG. 1;

FIG. 3 is an example of another connected kitchen appliance suitable for use with the system of FIG. 1;

FIGS. 11A to 11E are an example of an abstract recipe created as part of the recipe model;

FIGS. 16A and 16B are a representation of a section of a functional recipe in JavaScript Object Notation (JSON);

DETAILED DESCRIPTION

The following text sets forth a detailed description of the numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

The following disclosure describes several embodiments in the context of an on-line system for delivering recipes on-line to a user and interacting with internet-connected kitchen appliances. However, the embodiments described throughout the disclosure may also be applicable to any suitable type of recipe delivery system in which users can access recipes. As will be appreciated by those of ordinary skill in the relevant art(s), the instructions, ingredients and steps performable by connected appliance will change based upon the specific application.

The present application is directed at a system which is configured to allow a user to engage more generally in the cooking process, including the ability to select recipes, customize recipes and engage with connected appliances in a kitchen. The system allows for users to find recipes from other cultures and in other languages and have these presented in a context which matches their own. In this context, the system provides a recipe ingestion engine which has the ability to automatically convert traditional recipes into a form which allows for their contextual presentation to a user, enabling guided cooking.

Figure 1:
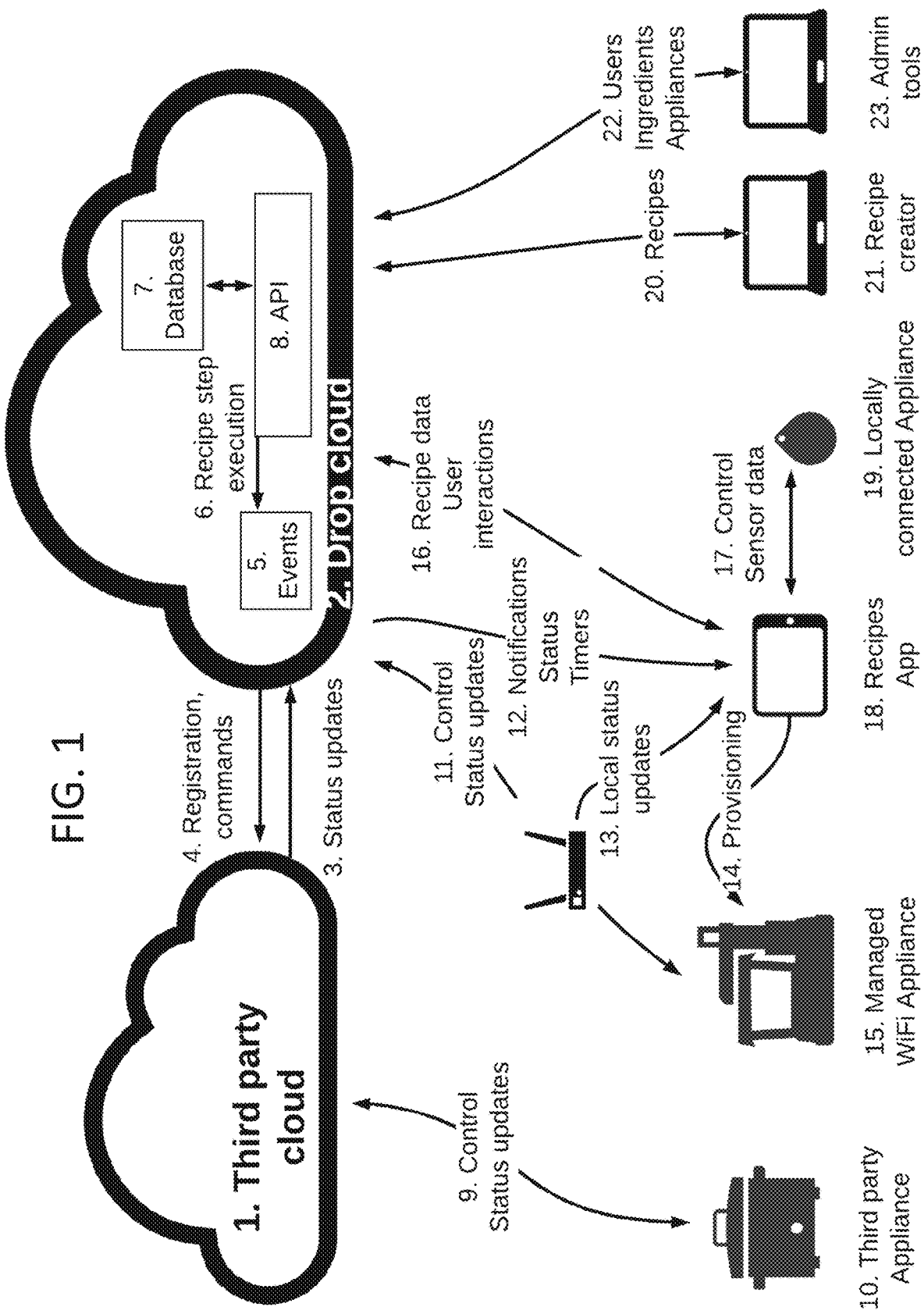
FIG. 1 is an illustration of a system according to a first aspect of the application.

An overview of an example system is shown in FIG. 1. The system comprises a number of different processing entities which may be regarded traditionally as servers 1, 2 and clients 10, 15, 18, 21, 23. At the core of the system is a server, identified hereinafter for convenience as the DROP CLOUD server 2.

The DROP CLOUD in turn interacts with one or more user computing devices 1, 15, 18, 21, 23. The DROP CLOUD communicates with the user computing devices using a first communication protocol, for example http or https, typically through the internet.

Examples of computing devices include desktop computers, a tablet computer, mobile phone and so on. Additionally, the user computing device may be integrated within an appliance, for example a cooker having a visual display or a television. The computing device may also be a computing device not having a display but which allows for user interaction by voice, for example an Amazon Echo device. Such devices are examples of what are more generally referred to herein as "processing devices." Some of these processing devices are also generally referred to herein as "computers."

The user computing devices allow a user to interact with the DROP CLOUD using a web-based connection through a network. This may be through a web interface 20, 22 or by means of an installed application on a computing device 18 interacting through an API interface 12, 16 of the DROP CLOUD.

In the context of the network, it is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The computer network in some embodiments therefore comprises combinations of multiple different types of networks, each comprising processing devices configured to communicate using internet protocol (IP) or other related communication protocols.

Additionally, the system may comprise one or more connected kitchen appliances 10, 15, examples of which are discussed below.

The user computing devices may be configured to have a wireless connection to one or more of the connected kitchen appliances. The wireless connection may include but is not limited to Bluetooth™, WiFi™ and Institute of Electrical and Electronics Engineers (IEEE) standard 802.15.4.

A connection between a user computing device and a connected kitchen appliance in terms of the transfer of status or control information may be considered as one-way or two-way. In a one-way connection 11, a user may be allowed, for example, to receive status information from a kitchen appliance, e.g., in the case of where the connected appliance is a weighing scales, the status information is a measure of the weight present on the scales or send an instruction, for example to turn on an appliance such as a kettle. In a two-way connection 17, the user computing device may for example receive status information and send instructions to the connected kitchen appliance 19. Thus, for example in the case where the connected appliance is an oven, a user might be able to send an instruction to turn on the oven and set the temperature to a desired temperature and the oven might return a status update when it has reached the set temperature.

The DROP CLOUD may also be configured to communicate with a connected kitchen appliance 15. This communication may be through a direct connection between the DROP CLOUD and the connected kitchen appliance, for example through an internet connection using a suitable local area network (e.g. a WiFi™ router) at the connected appliance. In this arrangement, control signals to and status updates 11 from the connected kitchen appliance are provided directly between the DROP CLOUD and the connected kitchen appliance 15.

In an alternative approach, the DROP CLOUD may establish a connection to an intermediary server (Third Party Cloud) 1 which is associated with the connected kitchen appliance 10. In this arrangement, the control signals to and status updates from the connected kitchen appliance are transmitted by means of a communication channel 9 with the intermediary server. Separately, there is a connection established between the DROP CLOUD and the intermediary server allowing the DROP CLOUD to provide control signals 4 and receive status updates 3. The intermediary server may be provided by the manufacturer of the connected kitchen appliance or an associated entity. The intermediary server in turn may have an API interface and the DROP CLOUD server may be configured to interact with the intermediary server using this API interface.

A connected kitchen appliance may have more than one channel of communication. In such a configuration, a connected kitchen appliance might have an established channel of communication opened with the DROP CLOUD (either directly or through an intermediary server) and a user computing device may establish a local communication channel directly 13 with the connected kitchen appliance using for example a WiFi™ or Bluetooth™ connection. The use of local connection will be more responsive allowing for a better user experience for tasks which require more immediate feedback, e.g. weighing interactively. Additionally. a connected device may be set-up initially using a direct connection 14 established between a user computing device, e.g. a smart phone or tablet 18.

The DROP CLOUD server is configured as three separate but interrelated functions. This functionality may be represented as three distinct servers, namely a database server 7, an (API) server 8, and an events server 5. The server may be implemented using a single physical server, several physical servers, a virtual server, or several virtual servers or any combinations thereof.

The database server is employed to store data in one or more databases as will be described below. The user interface server allows for user computing devices to interact with the server. This interaction may be through a web-interface and/or an API interface.

The events server provides for interaction between the API, client apps, and connected appliances. The nature of this interaction is such that it is desirable to have a server which is capable of handling these interactions in real time rather than as API or web request to the user interface server. Thus instructions 6 to connected kitchen appliances may be handed over from the API server to the Events server.

An example of a first connected kitchen appliance is shown in FIG. 2. The connected cooking appliance is a weighing scales (scale). An example of such a commercially available scale is that of the DROP™ scale. The scale 200 has a plate 202 on which items may be placed for weighing. A display 204 may be provided on the scale for viewing by a user. In a simple mode, the display may simply display the current weight on the scale. Separately, a processor 206 may using memory code stored in a memory 208 be configured to communicate with a user computing device using a wireless communications module 210. The wireless connection module may use one or more RF communication protocols, including for example but not limited to proprietary examples including WiFi™, Bluetooth™ and Zigbee™ and more generally as wireless protocols defined for example within the IEEE 802™ family of standards, e.g. Zigbee™ which is a networking protocol built upon IEEE802.15.4.

The wireless connection module allows the device to send measurements directly to the user computing device. The user computing device may have a software app running thereon. In some arrangements, the app may be configured to receive real-time information from the scale, using for example, a wireless connection, for example Bluetooth™, established with the scales. As will be described in greater detail below, the app may provide access to information regarding actions, ingredients, and target amounts involved in a recipe. This allows for the app to present a user with actions to be performed and ingredients to be added when following a recipe.

Where this functionality is employed, the processor may be configured to cause the display to present more useful information to the user. The processor may for example be used to display nutritional values for an identified ingredient being weighed. The processor may also display for example a connection status indicator showing the connection status with the user computing device. Additionally, the processor can cause the display to display real-time information for each ingredient where they are being added as part of a recipe being followed by a user. This may include the name of the current ingredient to be added; a measurement progress indicator (such as a bar graph) showing an amount of the current ingredient added proportional to its target amount.

The scale 200 may have lights and audio functionality that can be used to help inform the user when pouring/adding an ingredient. This may be easier for some users when pouring, which allows them to focus on the ingredients being added rather than the scale display. For example, audio messages from the scale can be played to call out ingredients and progress.

An example of a second connected kitchen appliance 300 is shown in FIG. 3. The connected cooking appliance is an oven. An example of such a commercially available oven is that of the Profile™ SERIES 30" appliance from General Electric. The oven 300 has a heating chamber with a door 302 in which items may be placed for cooking. One or more associated heating elements are provided (not shown) for heating the oven chamber. A display 304 may be provided on the oven for viewing by a user. In a simple mode, the display may simply display the current temperature of the oven, its mode of usage (fan, grill etc) and whether it is on or not. Separately, a processor 306 may, using memory code stored in a memory 308, be configured to communicate with a user computing device using a wireless communications module 310. Alternatively, the connected kitchen appliance may establish a connection with the DROP CLOUD server or the intermediary server as described above.

In both cases, the wireless connection module allows the device to send real time information to the user and receive commands from the user computing device either directly or through the DROP CLOUD. The user computing device may have a software app running thereon. The oven may have a number of pre-set programs, e.g. defrosting, keeping warm, baking, cooking, etc. which may be selected by the user or as will be described below potentially by the app on the user computing device.

Similarly, the oven may be configured to allow a user to remotely set the desired temperature of the oven. Similarly, the oven may be configured to allow a user to set one or more timers or clocks for turning on or off the oven.

The oven may also return status information to the app on the user device. This information may be the current operating mode, whether the oven is at a desired temperature or if available, the current temperature of the oven.

As with conventional ovens, the oven may have controls 312 to allow a user to operate the oven directly and may have lights and audio functionality to flag to a user when it has reached a desired temperature, when it has turned on or when a timer has expired.

Figure 4:
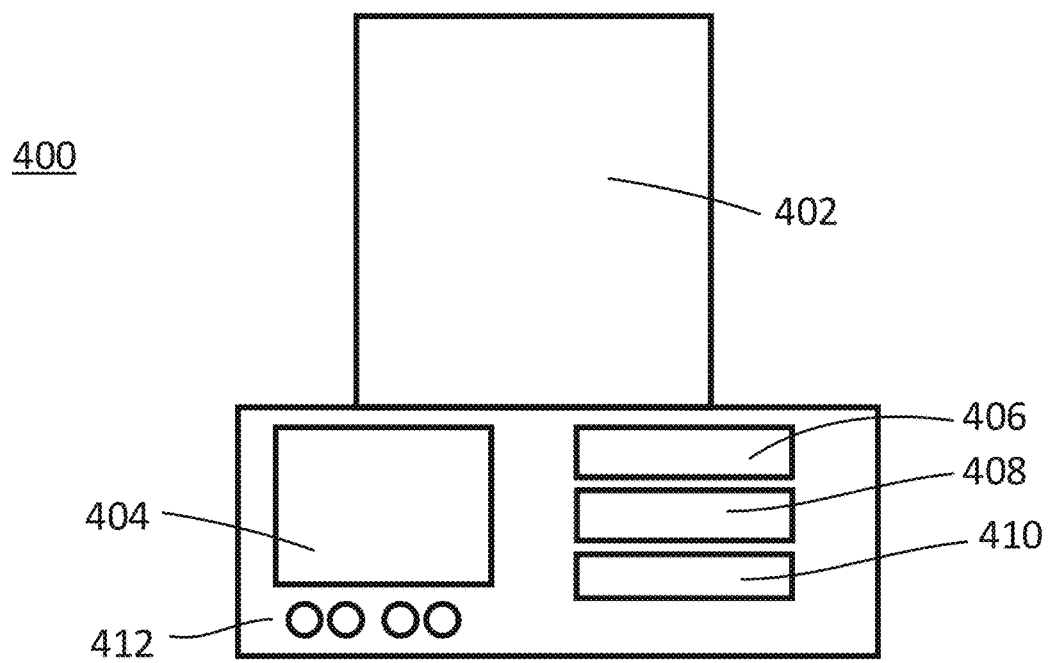
FIG. 4 is an example of a further connected kitchen appliance suitable for use with the system of FIG. 1.

A further example of a connected kitchen appliance is shown in FIG. 4 in the form of a combined food processor and cooking device. An example of such a connected cooking device would be the Kenwood kCook Multi Smart™. The appliance 400 has a cooking bowl 402 which is heatable by electric heating elements (not shown). The appliance also has a motor with attachments for stirring, mixing and chopping the contents. As with the other connected kitchen appliances, the device suitably has a display 404 and a number of controls 412 allowing a user to operate the appliance directly. As with the other devices, a processor 406 is provided with associated memory 408 to allow the device to interact with other devices through a wireless interface 410.

The present application provides a system which allows a user to search, retrieve, use and create recipes and to have the recipes tailored to suit their locality, language and where applicable connected kitchen appliances available to them.

The nature of the advantages of the system will now be discussed, before describing the system in detail.

Typically, appliance manufacturers provide recipes which are intended for and tested for use with their appliance. This ensures that a repeatable result is available to users of their appliance. Manufacturers spend considerable amounts of money testing recipes for their appliances, and providing such recipes to users of their appliances.

These recipes are typically provided in the form of a recipe book which is bundled with the appliance.

At the same time, traditional recipe books, whilst providing far more variety of recipes, do not always provide the necessary information to enable a user to set up their appliance for cooking a recipe Equally, online recipes merely replicate the traditional recipe book, potentially with the inclusion of some video content in which the user can follow someone else preparing the recipe, much like a cookery program on television.

However, whilst recipes are intended to be easily accessible, interpretable and usable by users, the opposite is often the case and user frustration is commonplace.

The inventors have identified a number of reasons for this. Firstly, food recipes are not universal. There are no standards in cooking recipes meaning that what works for one user in one country using one appliance may not work for another user in another country with a different appliance.

Where a recipe is presented in a different language to that of the user, there is an obvious problem with respect to interpreting ingredients and instructions. This equally applies where the language of the recipe and the user is the same (e.g., English), but the names for ingredients, actions and units vary from country to country. For example, "icing sugar" in the United Kingdom is referred to as "powdered sugar" in the United States.

Also, static food recipes (printed in a book or online) are contextually unaware of the user. For example, they do not take into account the availability of ingredients, or appliance capabilities, or the user's preferences, like units for weight and temperature.

Scaling is equally a problem, since recipes tend to be for a particular quantity of result, e.g., 8 servings/feeds 4.

Equally, measurements can be difficult to convert. In this context, for example, whilst certain weights and volumes may readily convert, there are others than prove extremely difficult. As a simple example, the measure of a teaspoon or dessert spoon will vary between countries. Similarly, there are references in recipes which do not have a precise measure at all, for example "a pinch of". The present application solves these issues by assigning an exact quantity to "a pinch", "a dash" etc., and converting between "weighable" and "non-weighable" ingredients as a recipe is scaled, i.e., if a recipe called for "5 g of salt", and the user scaled to 20%, the recipe would insert "a pinch" or "as needed" because this small quantity can't be weighed.

A further problem is ingredient substitution, since a particular ingredient may have a specific function in a recipe and depending on this function different substitutes may be available. For example, in different recipes, egg can fulfill different purposes as a binder, leavening agent, emulsifier, clarifying agent, and also as a garnish (i.e., boiled eggs in a salad). Suggesting a suitable substitute depends on a conceptual model of these different roles.

Another problem is that there is no standard for defining appliances and so different manufacturers and models may have different characteristics for notionally the same parameter.

In the context of connected kitchen appliances, the operation of these appliances through a user interface is generally performed in a simplified fashion in which the user is simply able to control the operation of the kitchen appliance using their own mobile phone or other connected computing device.

Additionally, the current approaches to connected kitchen appliances are focused on control of the operation of the appliance and, as a result, the capabilities of the appliance are not appreciable in a detailed, granular fashion which might allow integration within an interactive recipe process.

Figure 5:
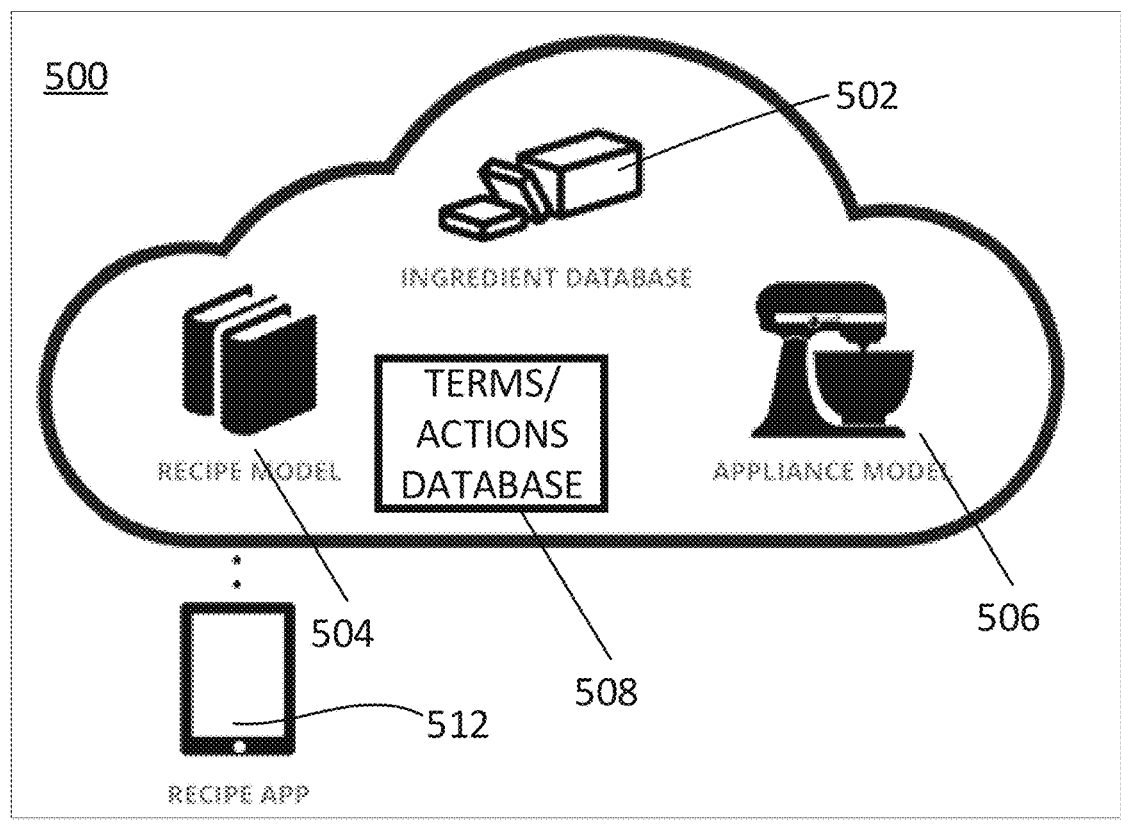
FIG. 5 illustrates different functional aspects implementable by the system of FIG. 1 and in particular recipe models, an ingredients database, a terms/actions database, and appliance models.

The present application provides a solution to these problems by creating an arrangement 500 which is implemented in the system of FIG. 1 (primarily within the DROP CLOUD) which allows users to interact with recipes and their connected kitchen appliances. The system operates by having an ingredient database 502, along with a recipe model 504, an actions database 508 and an appliance model 506 as shown in FIG. 5. These are implemented on the DROP CLOUD server and together co-operate with a recipe app 512 on a user's computing device to provide the user with a recipe they can use. The actions database may also be referred to as the terms database as it is used to action store terms, representing actions that may be employed in a recipe, examples of action terms include chop, bake, slice, mix, etc.

Having separate models 504, 506 for the recipes and appliances, allows steps in a recipe to be linked with the abilities of an appliance so that a user can effectively make any recipe they want reliably using the kitchen appliances (connected or otherwise) that they have available to them. Specifically, the integration of a Recipe Model and an Appliance Model results in the ability to create a user-centric Adaptive Recipe for a kitchen with connected kitchen appliances, which facilitates the use of all the required and available capabilities of the appliances in a connected kitchen, enabling and guiding the user to prepare a meal, following a highly personalized version of a recipe, which is adapted to the context of the user, his/her preferences, and the specific capabilities of the connected kitchen.

Figure 6:
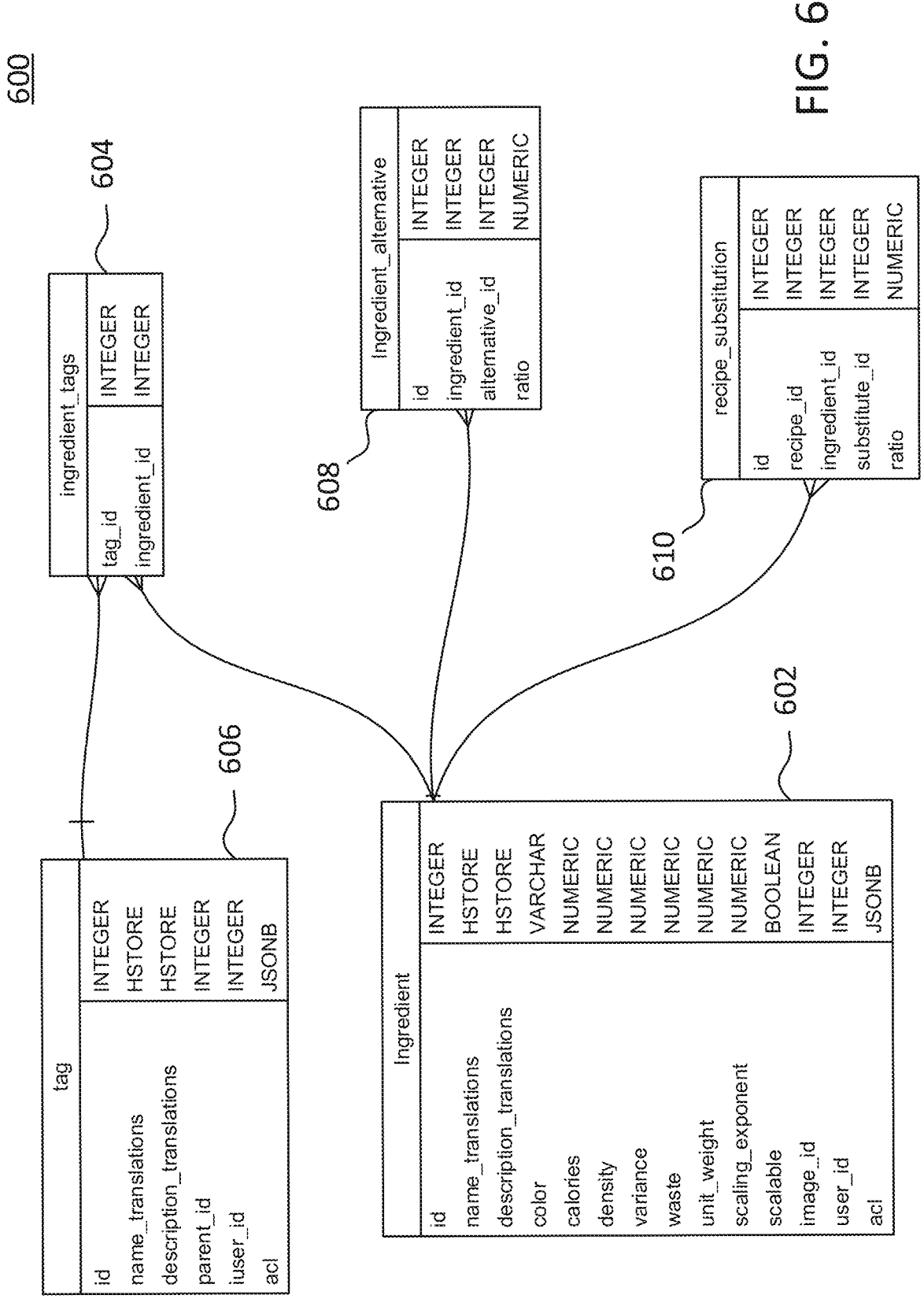
FIG. 6 is an illustration of an example schema suitable for implementation of the ingredients database.

The ingredients database 502 stores information on ingredients. An example data structure or schema 600 for the ingredients database is shown in FIG. 6. It will be appreciated that this schema, which contains a number of different tables, is example as with other schemas disclosed herein.

The nature of the schema will now be explained. In a first table, ingredients table 602, there is a field id. This field provides a unique ingredient identifier for each ingredient. Other fields in the ingredients table are identified below in the table along with their intended function.

Field Function name_translations The name_translations is a HSTORE table containing the translated strings for supported locales, representing a language locality.

description_translations The description_translations is a HSTORE table containing the translated strings for supported locales, representing a language locality.

color this provides an indication of the colour of the ingredient's icon calories this allows an indication of how many calories are present in a unit weight of the ingredient density this is to identify the density of an ingredient, which is important when translating between volumes and weights. By providing a density of every ingredient and inserting this information into this field it allows the transformation engine (described below) to present measurements in multiple formats with extreme precision.

For example, it's typical to read "1 Cup of Flour" in a US cook book, but for a home cook in Italy, this measurement would be displayed as "120 g of Flour".

variance The variance value represents an amount by which a unit of an ingredient might vary, for example eggs might have a variance of 20% meaning that there may be a ±20% variation from the average in the weight of an egg.

waste This value represents how much waste there might be in a product. As an example, potatoes might have a waste figure indicating the weight of the peelings.

unit_weight This is the average weight in grams for ingredients that have a unit quantity., e.g. eggs scaling_exponent This indicates how an ingredient is scaled. The scaling_exponent specifies the exponent, ie the power that the scaling factor must be raised to. Where this is 1, scaling works normally so a ratio of 2, to the power 1=2. If the scaling exponent was 0.9, the final ratio is 2^0.9=1.866 scalable This is a flag that is used to identify ingredients that can and more appropriately cannot be scaled, as the default is that an ingredient can be scaled.

image_id This represents the identifier of an image stored for the ingredient user_id This is an identifier allowing the identity of the user who entered the ingredient into the ingredients database to be identified acl This is an access control list identifying the permissions for the ingredient (ownership, read & write permissions)

Table 1—Fields in the Ingredient Table of the Ingredients Schema

It will be appreciated that not all of these fields, for example variance and waste, are required and may be omitted as fields from the table, whilst others such as is_liquid indicating whether the ingredient is a liquid or not can be included. At the same time, additional fields may be included to improve the performance of the system translating recipes into difference languages, such fields could include for example locale, locale metadata translations, and taxonomy which are used elsewhere as will be described below. The locale metadata translations field is employed to store metadata used in translation. These allow for example information regarding gender, plurality and grammatical constructs to be stored which may be employed in storing and presenting recipes to users.

The ingredients schema includes other tables 604, 608, 610 which in turn store information on ingredients using their ingredient identifier.

A second table 604, called the ingredients_tags table allows each ingredient to be tagged with certain tags identified by a tag identifier tag_id. Information regarding the tags are in turn stored in third table 606, called the tag table. As with the ingredient table it provides for linking translations associated with individual tags. Tags may be considered as a sub tag of another tag in which case this relationship may be identified using a value in the parent_id field. As a simple example, the tag 'dinner' may have the parent 'meal', which may be useful in data validation during recipe entry. It will be appreciated that tags may be very useful to allow a user narrow their searches.

Two further tables, ingredient_alternative 608 and recipe_substitution 610 allow significant flexibility when users are implementing a recipe.

The ingredient_alternative table allows an alternative ingredient, as identified in the alternative_id field to be linked with an ingredient, as identified in the ingredient id field and for a ratio to be identified in the ratio field to ascertain whether the alternative ingredient may be substituted directly (one for one, which would correspond to a ratio of 1) or whether a scaling is required when using the alternative. The ingredient_alternative may be regarded as generic, in that alternative ingredients are identified irrespective of their use in a recipe.

The recipe substitution represents an approach that is more specific to the alternative ingredients and identifies substitute ingredients (substitute_id) that may be employed to substitute for an ingredient (identified by an ingredient_id) in a particular recipe (identified by the recipe_id). The recipe_substitution values may be populated at the time of entry of a recipe, which is described below.

Suitably, the contents of the tables of the ingredients schema are not alterable by any user but restricted to users with certain privileges as identified by the access control list (ad). This ensures that ingredients are added in a consistent fashion.

Figure 7:
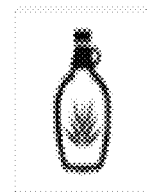
FIG. 7 is an example graphical user interface allowing a user to submit an ingredient into the ingredients database.

A suitable user interface may be provided to allow such a user with the necessary privileges to add an ingredient to the ingredients database. An example of such an interface 700 is shown in FIG. 7, which allows a user to enter or edit values for an ingredient (edit mode is shown). Where a new ingredient is entered, it will be assigned a new unique ingredient identifier.

Figure 8:
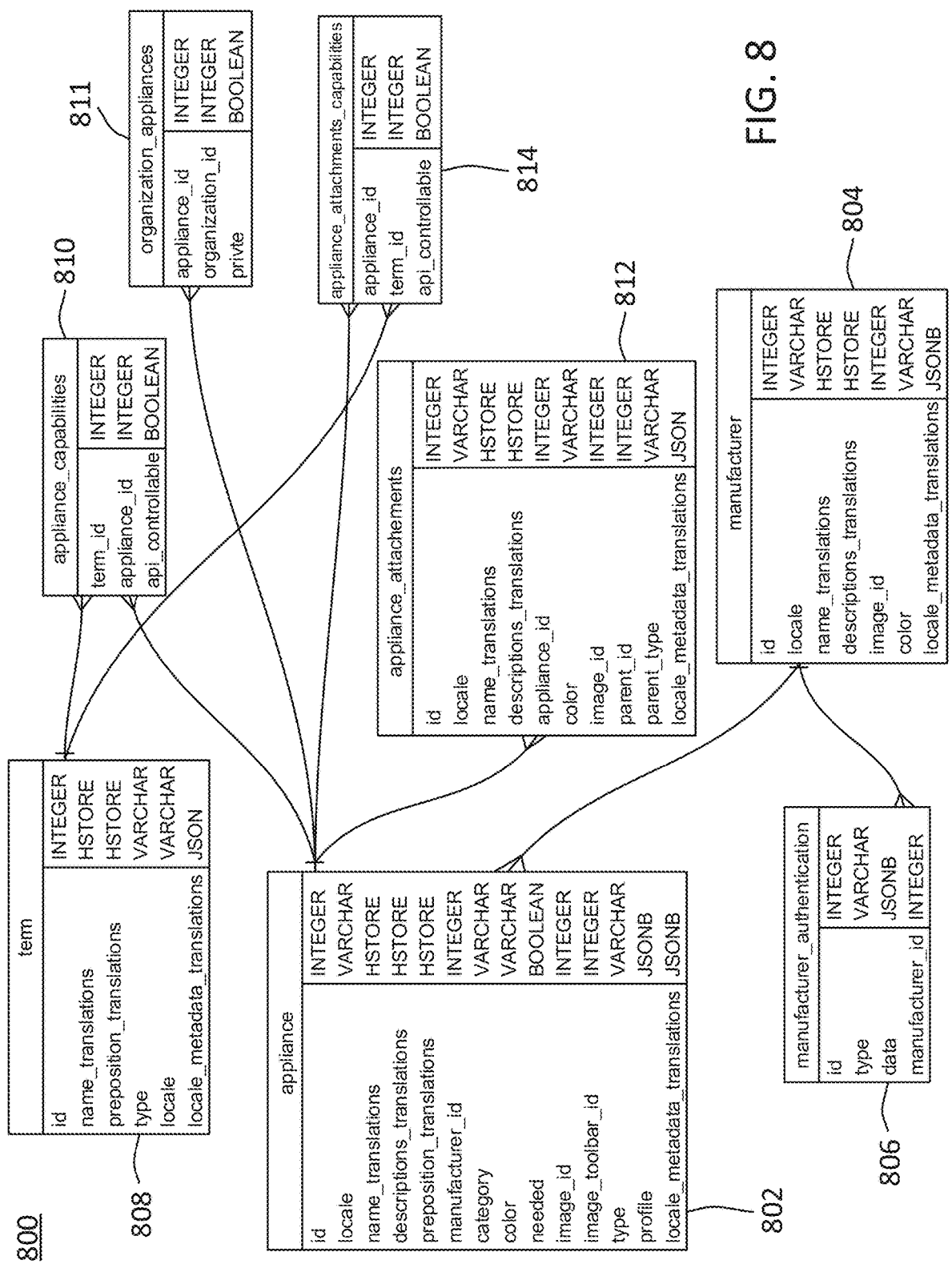
FIG. 8 is an illustration of an example schema suitable for storing details of actions and capabilities associated with recipe models in a database.

A schema 800 to implement the appliance model 506 is presented in FIG. 8 in which the primary table of note is an appliance table 802. The appliance table has a number of fields which, similar to the ingredients table, allow for different appliance models to be uniquely identified.

In the appliance table 802, there is a field id. This field provides a unique ingredient identifier for each ingredient. Other fields in the ingredients table are identified in the table below along with their intended function.

Field Function id This field is to store unique identifiers for appliances locale this is language/country combination originally used to enter the data name_translations This field is used to store translations of the names of products descriptions_translations This field is used to store translations of the descriptions of products preposition_translations This field is employed to translate prepositions associated with the product manufacturer_id This field identifies a manufacturer category This field identifies the category of an appliance. example categories may include for example oven, cooker, food processor etc color This field may be used to provide the colour of the appliance's icon needed The "needed" flag is used to indicate that the recipe cannot be used without this specific appliance.

image_id This represents the identifier of an image stored for the ingredient image_toolbar_id This represents the identifier of an image stored for the ingredient which can be reproduced on a toolbar for a user type This field is used to denote a connected appliance ie. one that can be monitored or controlled via a local or remote network connection.

profile This stores a profile of the appliance which may be employed to identify how the appliance may for example be operated, connected and controlled etc locale_metadata_translations These represent metadata used in generating localised sentences referring to the appliance.

Different fields within the appliance table link allow for relationships to be created with other tables 804, 810, 811, 812, 814. Thus, in the case of a table 804 which identifies the manufacturers, the manufacturer_id of the appliance table allows for a relationship to be made. The manufacturer table contains fields which may beneficially be used to store details about individual manufacturers, including their name and descriptions in different languages (name_translations and descriptions_translations) along with an image for the company logo (image_id) and an associated colour.

A related table 806 may be used to store data regarding how the manufacturer provides authentication of their products.

A term table 808 is used to identify different actions which may be performed in a recipe. Examples of actions would include, chop, cut, slice, heat, bake, fry, grill, etc. The term table is employed for other purposes and is not specific to appliances and can, for example, be employed to identify the actions in individual steps of a recipe.

The term table has a number of fields including an id field which allows individual actions to be uniquely identified. The remaining fields are provided to allow an action to be described in different languages.

An appliance's ability to perform actions is identified by entries with an appliance_capabilities table 810 in which actions (term_id) can be associated with appliances (appliance_id corresponding to the id in the appliance table).

Another field api_controllable identifies whether the action is controllable remotely from the appliance.

Certain appliances will have different attachments available. These attachments may be provided with the appliance or purchased separately. To account for this an appliance_attachments table 812 is provided which allows such attachments to be uniquely identified by an identifier (id field). Each attachment has an associated appliance_id which refers to it's parent in the appliance table. Similar to the appliance_capabilities table 810, there is an appliance_attachments_capabilities table 814 which may be used to identify actions that an attachment may be used for.

By embedding the translation information within the various tables, it is readily possible to allow for the translation of the information associated with ingredients, appliances, manufacturers, actions and other words into different languages and locales. As an example, the language of English might be regarded to be spoken in different locales Australia, the UK and the US although the name of notionally the same ingredient may vary considerably between them.

The use of such a translation and localization database in combination with the unique ingredient identifiers format in the ingredients database allows a recipe application to retrieve a recipe from the DROP CLOUD simply by providing the recipe id and the user settings, e.g., their language and country.

The appliance model allows for appliances to be specified in a consistent manner and for new appliances to be added as required to the DROP CLOUD. The appliance model details the capabilities (functions) that the particular appliance may perform. These functions in turn are each uniquely associated with a capability ID, which again in combination with the translation and localization database allows for these capabilities to be presented to a user in the recipe app on their computing device in their own language.

Other parameters that may be provided in the appliance model include, the appliance name, the category of device the appliance is, the appliance color, the appliance description, and images of the device.

Interfaces similar to the ingredients interface described above may be provided to allow users to create and update manufacturers, appliances, actions and attachments.

At the same time, the DROP CLOUD server may send a stored model for an appliance to the recipe app or others apps in the form of a suitable structure, which may for example be Extensible Markup Language (XML) or JSON code.

An example structured data representation of an example model for an appliance is shown below

```
{
  "capabilities": [
    {
      "id": 5,
      "name": "Bake",
      "preposition":
      "type": "action",
      "uri": "/api/v1/terms/5"
    },
    {
      "id": 58,
      "name": "Pre-heat",
      "preposition":
      "type": "action",
      "uri": "/api/v1/terms/58"
    },
    {
      "id": 247,
      "name": "Roast",
```

```
            "preposition":
            "type": "action",
            "uri": "/api/v1/terms/247"
        },
        {
            "id": 284,
            "name": "Pre-bake",
            "preposition":
            "type": "action",
            "uri": "/api/v1/terms/284"
        },
    ],
    "category": "Oven",
    "color": "#000000",
    "description": null,
    "id": 174,
    "image": {
        "data": {
            "copies": {
                "128×128": {
                    "uri":
"https://d25ztq5itsg0zk.cloudfront.net/b8fb99ec92a74125b0c89d40554912ff-128×128"
                },
                "150×150": {
                    "uri":
"https://d25ztq5itsg0zk.cloudfiront.net/b8fb99ec92a74125b0c89d40554912ff-150×150"
                },
                "256×256": {
                    "uri":
"https://d25ztq5itsg0zk.cloudfront.net/b8fb99ec92a74125b0c89d40554912ff-256×256"
                },
                "32×32": {
                    "uri":
"https://d25ztq5itsg0zk.cloudfront.net/b8fb99ec92a74125b0c89d40554912ff-32×32"
                },
                "64×64": {
                    "uri":
"https://d25ztq5itsg0zk.cloudfront.net/b8fb99ec92a74125b0c89d40554912ff-64×64"
                }
            },
            "height": 256,
            "key": "b8fb99ec92a74125b0c89d40554912ff",
            "mimetype": "image/png",
            "name": "icon_GE_oven2x_1 .png",
            "uri":
"https://d25ztq5itsg0zk.cloudfront.net/b8fb99ec92a74125b0c89d40554912ff",
            "web":
"https://d25ztq5itsg0zk.cloudfront.net/b8fb99ec92a74125b0c89d40554912ff-web"
            "width": 256
        },
        "id": 10965,
        "uri": "/api/v1/images/10965"
    },
    "image toolbar": {
        "data": {
            "copies": { },
            "height": 100,
            "key": "c61133ef88b9459fb4803150cc7e7e4b",
            "mimetype": "image/png",
            "name": "Toolbar_-_GE_Oven2x.png",
            "uri":
"https://d25ztq5itsg0zk.cloudfront.net/c61133ef88b9459fb4803150cc7e7e4b",
            "width": 100
        },
        "id": 21367,
        "uri": "/api/v1/images/21367"
    },
    "manufacturer": {
        "color": "#3a5dae",
        "description": "Imagination at Work.",
        "id": 5,
        "name": "General Electric",
        "uri": "/api/v1/manufacturers/5"
    },
    "name": "GE Appliances Oven",
    "needed": true,
    "preposition":
```

```
"profile": { },
"tags": [ ],
"type": "smart",
"uri": "/api/v1/appliances/174"
}
```

The use of the appliance model ensures that there is a consistent approach which allows for the integration of multiple appliances from multiple different manufacturers within the DROP CLOUD server and for use by the recipe app on individual user computing devices.

A user database is employed to store characteristics associated with individual users. This database may be centralized in the DROP CLOUD server database or the database may be distributed or partially distributed with the recipe app or computing device of individual users. The user database may identify the user. Optionally, the user database may also specify settings or preferences of the user (e.g., language and location), and any appliances that they may have. Alternatively, the settings or preferences employed may be stored locally on the computing device of the user, optionally as settings within the device (e.g., language and locality).

The recipe model which provides significant flexibility in combination with the appliance model and ingredients database will now be described.

The recipe model is a combination of rules, engines and data structures which combine together to provide the model which in turn is accessed by users employing the recipe app on their computing devices.

The recipe model presents a single recipe in several different forms which allows, for example, a recipe to be localized to a user and customized for their appliances. Having the recipe in different forms allows for considerable flexibility and ensures a greater efficiency and operability when users are selecting a recipe using the recipe app on their connected device. Similarly, the use of the recipe model enables the automatic recognition of the contents of a traditional recipe, and the ability to reproduce the original recipe to a user on their device in their language and locale of choice (which may differ from the language of the original recipe).

Figure 9:
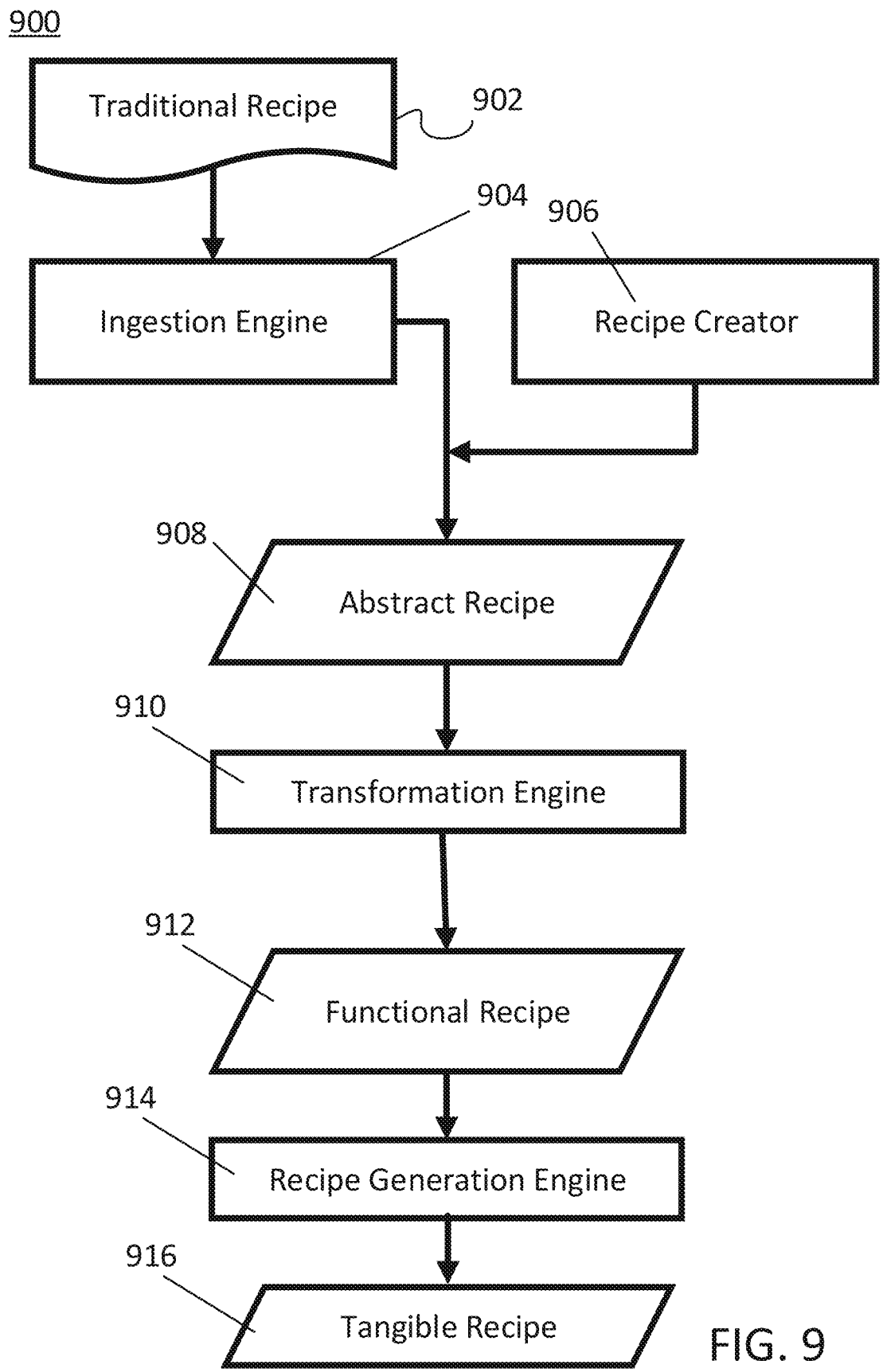
FIG. 9 is an illustration of an example of an arrangement of different aspects of the system and how they operate with different types of recipes.

The forms of recipe will now be described in the context of producing a recipe for use by a user with reference to the method 900 of FIG. 9.

The first form of recipe is that of a comprehensible recipe 902. A comprehensible recipe is one which would be readily understood by a user and would correspond to a human-readable (traditional) recipe, as may be found in a recipe book or on-line.

In this context, a user may be allowed using the recipe application on their computing device to take a copy of a recipe (for example using a camera in their computing device and in the case where the device is a mobile phone is straightforward). Alternatively, a user may provide a link or browse to a particular webpage having the traditional recipe.

Alternatively, the system may be set-up to crawl recipe websites and retrieve recipes from the websites. Alternatively, the recipes may be stored in a way which allows them to be retrieved either sequentially or en-masse.

A traditional recipe (Traditional Recipe) is defined as a human comprehensible recipe in a particular human language and represented either as:

Text(s), e.g., text specifying the ingredients and cooking directions for the recipe,
Audio/Sound clip(s),
Scan(s), e.g., a picture(s)/scan(s) of a recipe book page(s),
Image(s) (2D or 3D), e.g., sequence of images of the how a plurality of ingredients are transformed into a final dish,
Video, e.g., how one or several people cook the recipe,
JSON,
XML,
Hypertext Markup Language (HTML),
URL or other link to the location where the recipe is available,
Other multimedia format,
or any combination of the above.

A copy of the Traditional Recipe may be stored as a record in the recipe model.

The Traditional Recipe is processed by an ingestion engine 904 and converted into an abstract recipe 908.

An abstract recipe (Abstract Recipe) is defined as a data structure comprising of a combination of the following:

Recipe ID—unique identifier for the recipe.
Source.
Author—identifier for the author.
Title—structure that associates a human language and a locality with a string representing the title of the recipe in the corresponding locale, e.g.,
{"en-us": "lamb chops",
"es-es": "chuletas de cordero"}.
Description—structure that associates a human language and a locality with a string representing the description of the recipe in the corresponding locale.
Set of ingredients with quantities and measures. The ingredients identified by their associated unique identifiers from the ingredient database. Each ingredient may also be associated with a corresponding quantity. The quantity in turn may be presented in the form of a weight.
List (or graph) of cooking steps. The steps are associated with actions by the unique action identifier from the actions database. Each step is associated with an action identifier, an object identifier, an ingredient identifier, a set of ingredient identifiers, or a combination thereof. Timing information may also be associated with one or more of the individual steps. Individual steps may be identified as variable based on user's preferences. Thus for example, in the case of meat, whilst a target time may be provided, this may be modified later in the functional recipe to account for a user's preference for how well done they like their meat cooked, e.g. rare, medium, or medium well. Similarly, other measurable parameters may be associated with a step. As an example, a temperature may be associated with a step, as an example instead of "roast for an hour", a description may be provided referencing the use of a temperature meat probe and providing a temperature, for example "roast until a core temperature of 67 degrees is reached". Equally, this temperature may be adjusted to account for different preferences of a user for how well done they like their meat for example. Descriptive information may be stored with each step.

List of (generic) appliances needed to prepare the recipe, e.g., oven, food processor, blender. These are represented as identifiers from the appliances table. Each cooking step may be associated with an appliance identifier corresponding to a generic appliance that may be used for the step.

List of containers needed to prepare the recipe, e.g., large bowl, 5-quart stockpot. These are represented as identifiers from the containers table.

List of tools needed to prepare the recipe, e.g., spatula, paring knife. These are represented as identifiers from the tools table.

Cooking time—overall cooking time, including preparation, e.g., 50 minutes.

Output measure, the yield of a recipe, e.g., 6 servings.

Nutritional information, e.g., calories, fat, carbohydrates, protein, cholesterol, sodium.

Difficulty level.

Set of tags or recipe categories, e.g., Mediterranean, French, Vegan. These are represented as identifiers from the tags table.

Average rating.

Rating distribution.

List of reviews—structure that associates a human language and a locality with a list of review identifiers representing the reviews for the recipe in the corresponding locale.

Related recipes—a list of recipe identifiers.

Related categories—a list of category identifiers.

Multimedia information associated with the recipe, e.g., video clips about cooking one or more of the steps in the recipe (indexed by country and locality).

Date of original creation.

Date of last update.

Users that have cooked the recipe (and how many times and when).

Other information.

Figure 10:
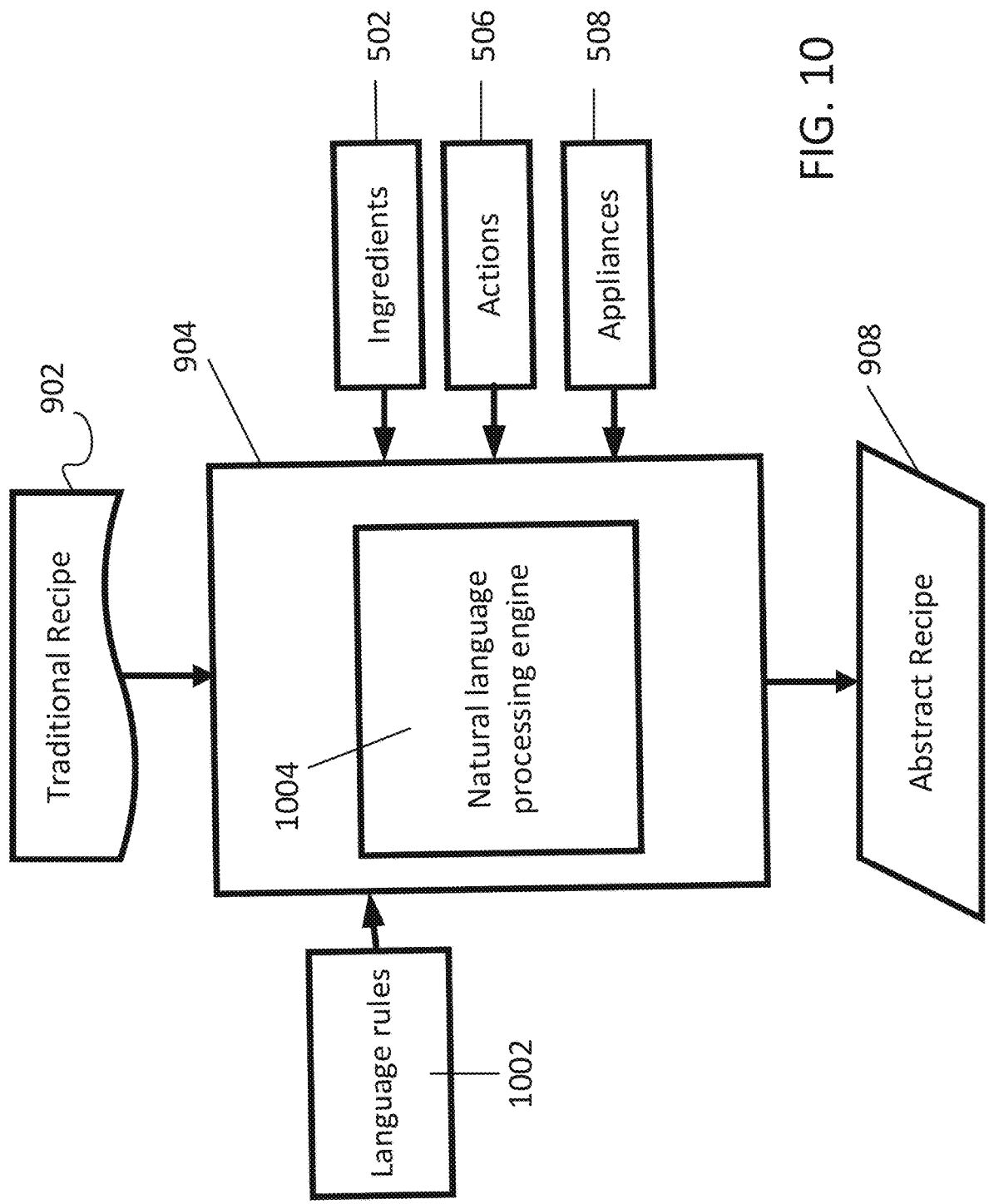
FIG. 10 is an illustration of an example aspect of the functional aspects of the system of FIG. 5 describing the ingestion engine.

An ingestion engine (Ingestion Engine) 904 is defined as a system which is configured to convert a Traditional Recipe into an Abstract Recipe as illustrated in FIG. 10.

The Ingestion Engine takes a Traditional Recipe 902 as input (e.g., it may retrieve the HTML of a recipe at an identified URL). The ingestion engine uses the ingredients database 502, actions database 506 and appliance database 508 to process the traditional recipe into an abstract recipe where individual elements of the abstract recipe are references to entries in these databases. Specifically, the ingestion engine may accept an inputted Traditional Recipe. The ingestion database may then parse the recipe and extract in raw, textual, unstructured form as much information corresponding to the fields of an Abstract Recipe as possible. If the recipe input is audio, the recipe input is suitably first converted to text. Certain fields of an Abstract Recipe may not be present in the input Traditional Recipe (e.g., users that have cooked the recipe is not present in a recipe cookbook). During the extraction phase the Ingestion Engine distinguishes between the list of ingredients section and the list of cooking directions section.

The ingredients section is further processed into a list of strings corresponding to each ingredient (e.g., "1 cup shredded Cheddar cheese"). Each ingredient string is analyzed using a language-specific natural language processing engine 1004 (NLP sub-system) which creates a corresponding recipe ingredient data structure. The natural language processing engine is responsive to language rules 1002. This will now be explained further.

Figure 11B:
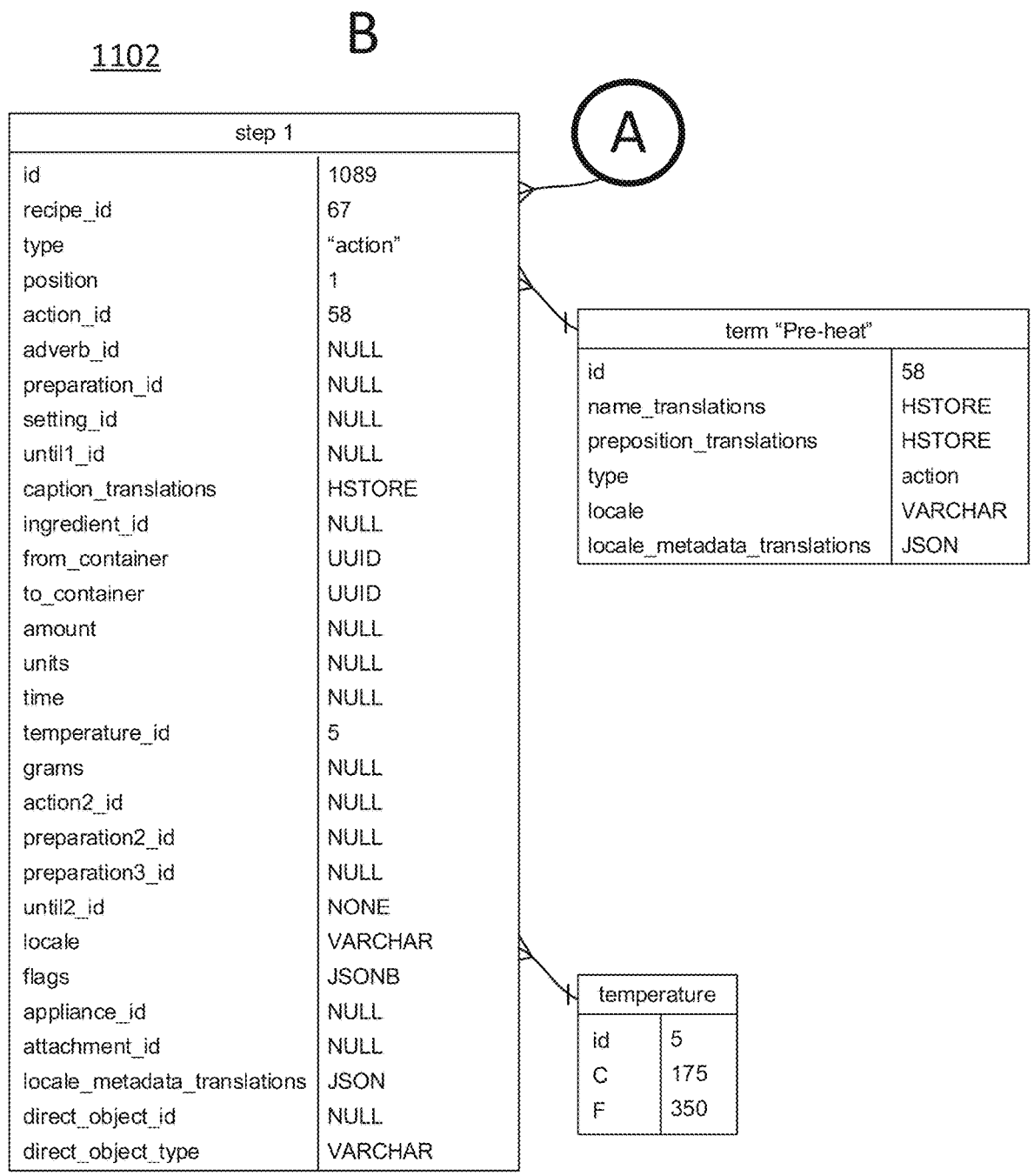

In an abstract recipe, for example as shown in FIG. 11A, details concerning the recipe are stored as fields within one or more fields in a table 1100. This table contains general information regarding the recipe, including for example, a unique identifier for the recipe, i.e. a recipe identifier, (id), dates of creation, the number of servings and other information. The steps 1102, 1104, 1106, 1108 of the Abstract Recipe are stored as entries in a table. These entries are suitably linked using a common recipe id. Thus, FIG. 11B represents a first step 1102 in a recipe, FIG. 11C a second step 1104 in a recipe and FIG. 11D a third step 1106 and FIG. 11E illustrates that there may be further steps. Actions, ingredients, utensils and appliances which would have been identified as text in a traditional recipe are referenced by identifier. Thus, for example, an ingredient for a recipe would be identified by a recipe ingredient identifier referring to an entry in the ingredients database.

In this context, a recipe ingredient (RecipeIngredient) may be defined as a data structure comprising:

Ingredient identifier—unique identifier from the ingredient database, e.g., identifier for "Cheddar cheese".

Quantity—numerical quantity combined with the measure (below) to identify the needed amount of the ingredient to cook the recipe, e.g., 1.

Measure—an identifier corresponding to the measure, e.g., identifier for "cup".

Preparation(s)—identifier(s) for the preparation action(s), e.g., identifier for "shredded".

The output RecipeIngredient uses identifiers and does not contain language-specific information.

It is the ingredient database that suitably contains language-specific information, including the canonical name of an ingredient and the alternate forms (indexed by country and locality). During the ingredient section processing the canonical names of ingredients as well as their alternate forms are matched against the input ingredient string to identify the ingredient.

Thus, the Traditional Recipe may use different wording than the corresponding wording that will be applied in the tangible recipe which is a transformed version of the Abstract Recipe, e.g., the ingredient chickpeas could be changed to garbanzo beans and the ingredient zucchini could be changed to courgette or vice versa.

The ingredient section analysis handles abbreviations of measures, e.g., tablespoon←tbsp, tblspn.

teaspoon←tsp, tspn.

fluid ounce←oz, fl oz.

quart←qt.

The same ingredient identifier may be referred to several times in different RecipeIngredients, e.g.,

INGREDIENTS

½ cup butter, softened.

1 tablespoon melted butter.

The input ingredients section may be semi-structured in that it may contain labeled groups of ingredients, e.g., GLAZE below:

INGREDIENTS

GLAZE:

2 cups confectioners' sugar.

2 tablespoons lemon juice.

These ingredient groups are suitably identified during the ingredient section analysis. The ingredient groups may be further used during the processing of the cooking directions.

The ingredient analysis may be configured to be capable of dealing with disjunctions, e.g.,
INGREDIENTS
2 tablespoons olive or vegetable oil.
which is analyzed as "2 tablespoons of olive oil" or "2 tablespoons of vegetable oil". Another example is:
INGREDIENTS
1 cup butter or margarine, softened.
which is analyzed as "1 cup butter, softened" or "1 cup margarine, softened".

Handling ingredient disjunctions also helps with inferring ingredient substitutions.

The cooking directions section is then processed in a series of steps. The input cooking directions section may be semi-structured in that it may be split into several cooking directions subsections each of which may be as paragraphs consisting of several natural language sentences. These cooking directions subsections are preserved by the processing.

The text of the cooking directions is analyzed as a sequence of sentences consisting of tokens (tokenization and sentence detection).

The tokenizer ensures that fractions, hyphenated words, abbreviations and the corresponding period are kept as a single token, e.g.,
"½ cup sugar"→["½", "cup", "sugar" ] rather than ["1", "/", "2", "cup", "sugar" ]
"1.5 cup sugar"→["1.5", "cup", "sugar" ] rather than ["1", ".", "5", "cup", "sugar" ]
"all-purpose flour"→["all-purpose", "flour" ] rather than ["all", "-", "purpose", "flour" ]
"self-rising flour"→["self-rising", "flour" ] rather than ["self", "-", "rising", "flour" ]
"pre-heated oven"→["pre-heated", "oven" ] rather than ["pre", "-", "heated", "oven" ]
"gluten-free cake"→["gluten-free", "cake" ] rather than ["gluten", "-", "free", "cake" ]
"2 qt. baking dish"→["2", "qt.", "baking", "dish" ] rather than ["2", "qt", ".", "baking", "dish" ]
"3 in."→["3", "in." ] rather than ["3", "in", "." ]

The tokenizer is configured to deal with international characters, and special characters, e.g.,
"sauté"→["sauté" ]
"510° F."→["510", "° F." ]
"265° C."→["265", "° C." ]

In this context, the tokenizer may be a statistical, machine learning system trained on data that is pre-annotated with a pattern-based system. Optionally, post-editing by humans may be allowed and performed.

Within each sentence the Ingestion Engine identifies terms (phrases) corresponding to various semantic types (action, ingredient, container, appliance, tool, appliance setting, temperature, time, etc.). This task is known in the natural language processing field as mention detection.

Next, the Ingestion Engine may apply part-of-speech tagging and syntactic analysis. The syntactic analysis takes as input the list of tokens in the sentence with their associated predicted part-of-speech tags, and additionally may employ the information from the previously identified phrases of actions, ingredients, containers, appliances, etc. (and their semantic type). The output of the syntactic analysis is a syntactic sentence structure which may be a dependency graph.

Figure 23:
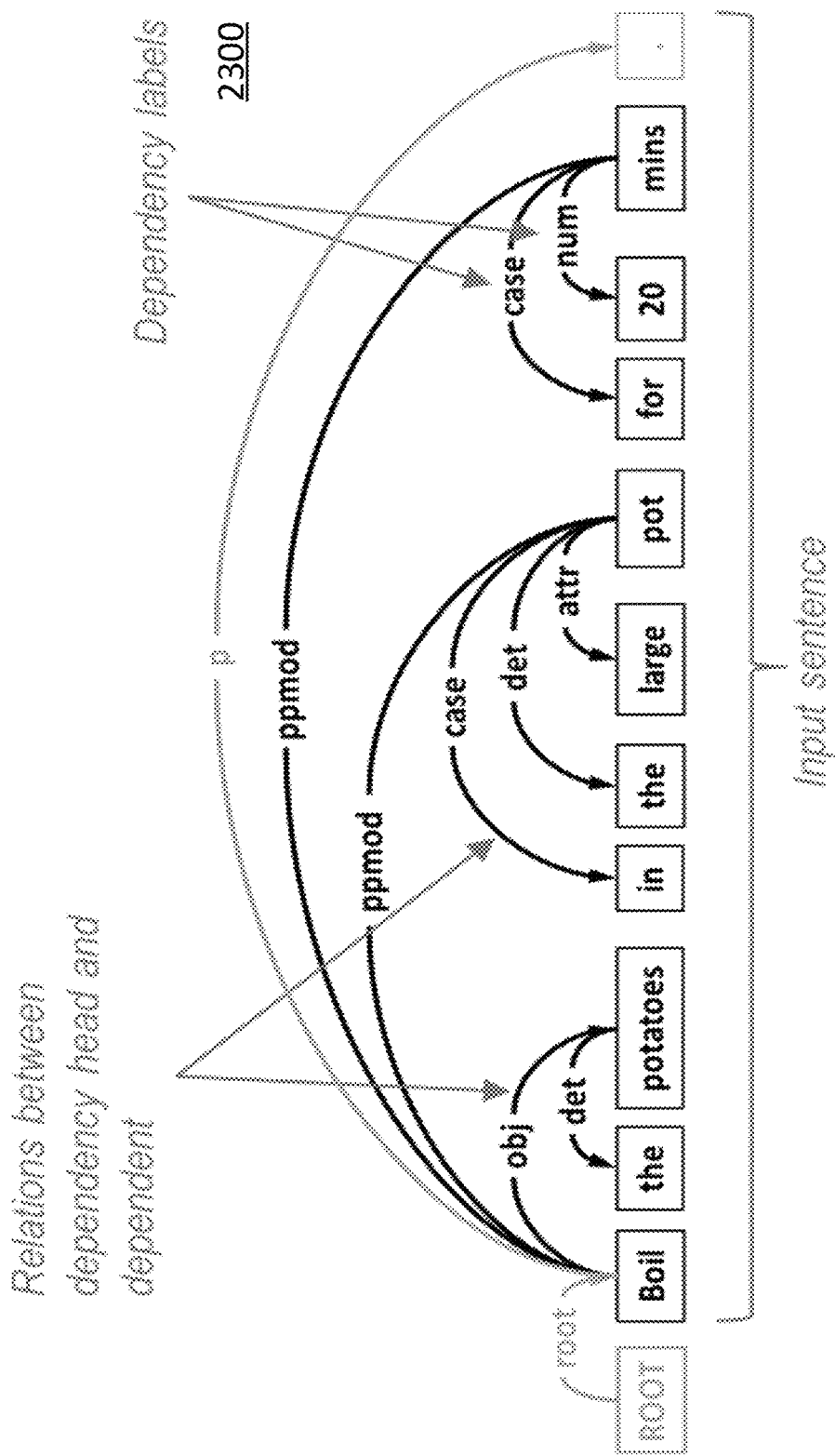
FIG. 23 is an example as to how an instruction in a recipe may be analyzed into appropriate elements.

An example of the syntactic structure as a dependency graph 2300 is illustrated in FIG. 23 for the tokenized sentence:

["Boil", "the", "potatoes", "in", "the", "large", "pot", "for", "20", "minutes", "."]

A syntactic analysis system that produces output dependency representations is referred to as a dependency parser. The Ingestion Engine uses a statistical, Machine Learning-based dependency parser, trained on a corpus of sentences and their corresponding dependency structures represented in a textual, tab-separated (TSF) format in the following fashion:

| 1 | Heat | heat | VB | 0 | root | | |
|---|---|---|---|---|---|---|---|
| 2 | the | the | DT | 3 | det | | |
| 3 | oil | oil | NN | 1 | obj | | |
| 4 | in | in | IN | 7 | case | | |
| 5 | a | a | DT | 7 | det | | |
| 6 | large | large | JJ | 7 | attr | | |
| 7 | skillet | skillet | NN | 1 | ppmod | | |
| 8 | , | , | , | 1 | P | | |
| 9 | and | and | cc | 1 | cc | | |
| 10 | the | the | DT | 11 | det | | |
| 11 | beef | beef | NN | 1 | conj | | |
| 12 | a | a | DT | 14 | det | | |
| 13 | few | few | JJ | 14 | attr | | |
| 14 | pieces | piece | NN | 1 | advnp | | |
| 15 | at | at | IN | 17 | case | | |
| 16 | a | a | DT | 17 | det | | |
| 17 | time | time | NN | 14 | ppmod | | |
| 18 | until | until | IN | 23 | mark | | |
| 19 | all | all | PDT | 21 | det | | |
| 20 | the | the | DT | 21 | det | | |
| 21 | pieces | piece | NNS | 23 | nsbj | | |
| 22 | are | be | VBP | 23 | cop | | |
| 23 | in | in | IN | 1 | advcl | | |
| 24 | the | the | DT | 25 | det | | |
| 25 | pan | pan | NN | 23 | obj | | |
| 26 | , | , | , | 1 | P | | |
| 27 | then | then | RB | 28 | adv | | |
| 28 | add | add | VB | 1 | conj | | |
| 29 | the | the | DT | 30 | det | | |
| 30 | onion | onion | NN | 28 | obj | | |
| 31 | and | and | CC | 28 | cc | | |
| 32 | fry | fry | VB | 1 | conj | | |
| 33 | over | over | IN | 36 | case | | |
| 34 | a | a | DT | 36 | det | | |
| 35 | medium | medium | | JJ | 36 | attr | |
| 36 | heat | heat | NN | 32 | ppmod | | |
| 37 | , | , | , | 32 | P | | |
| 38 | stirring | stir | VBG | 32 | advcl | | |
| 39 | , | , | , | 32 | P | | |
| 40 | until | until | IN | 45 | mark | | |
| 41 | the | the | DT | 42 | det | | |
| 42 | meat | meat | NN | 45 | obj | | |
| 43 | is | be | VBZ | 45 | aux | | |
| 44 | evenly | evenly | RB | 45 | adv | | |
| 45 | browned | brown | VBN | 32 | advcl | | |
| 46 | . | . | . | 1 | p | | |

The final dependency parsing model and the final corpus are created by first manually annotating an initial dataset of (tokenized) sentences from the domain of cooking directions, and training an initial dependency parsing model. Then, in an iterative fashion:
A new, additional set of sentences is sampled from the domain of cooking directions. These sentences are tokenized and automatically pre-annotated by the current model;
A human corrects the automatic output using a tool for creating/updating dependency representations;
The previous training data and the new additional set are combined into a new larger training dataset. A new model is trained using the new larger training set.

Next, the Ingestion Engine applies ingredient co-reference resolution. For each phrase of semantic type INGREDIENT in the cooking directions, the system finds the best scoring RecipeIngredient from the recipe ingredients for the current recipe. For this purpose the system employs a Machine Learning sub-system that uses the canonical and alternate phrases associated with the RecipeIngredients and compares them with the current phrase from the cooking directions.

If the current phrase of semantic type INGREDIENT is a pronoun ("it" or "they") the system establishes a co-reference link between the current pronoun and a previous INGREDIENT phrase. The system then associates the pronoun with the corresponding RecipeIngredient of the previous INGREDIENT phrase. To perform this coreference within the cooking directions another Machine Learning subsystem is employed.

Additionally, during ingredient co-reference resolution, the Ingestion Engine may encounter implicit ingredients that are not mentioned explicitly in the ingredient section (e.g., "salt", "water", "salt and pepper"). In such cases the Ingestion Engine adds corresponding RecipeIngredients for the current recipe.

Additionally, the Ingestion Engine may be configured to co-refer a single phrase of semantic type INGREDIENT to a set of ingredients. This is the case with labeled ingredient sets, semantic generalizations of ingredients, and dynamic ingredient set.

Here is an example of coreference involving labeled ingredient sets:
INGREDIENTS
. . .
TOPPING
⅔ cup packed brown sugar
⅔ cup chopped pecans
⅔ cup flaked coconut
2 tablespoons butter, melted
. . .
DIRECTIONS
. . .
Combine the topping ingredients
. . .

In this case, "the topping ingredients" phrase of semantic type INGREDIENT is associated with the RecipeIngredients corresponding to:
⅔ cup packed brown sugar
⅔ cup chopped pecans
⅔ cup flaked coconut
2 tablespoons butter, melted Here is an example of coreference involving semantic generalizations of ingredients:
INGREDIENTS
½ cup sugar
½ cup packed brown sugar
3 tablespoons all-purpose flour
1 teaspoon ground cinnamon
¼ teaspoon ground ginger
¼ teaspoon ground nutmeg
DIRECTIONS
. . .
In a small bowl, combine the sugars, the flour and the spices; set aside.
. . .

In this case, "the sugars" phrase of semantic type INGREDIENT is associated with the RecipeIngredients corresponding to:
½ cup sugar
½ cup packed brown sugar
and "the spices" phrase of semantic type INGREDIENT is associated with the RecipeIngredients corresponding to:

1 teaspoon ground cinnamon
¼ teaspoon ground ginger
¼ teaspoon ground nutmeg

The Ingestion Engine suitably is configured to utilize ontological relationships to determine that certain specific ingredients are related to a more generic category of ingredient, e.g. that cinnamon, ginger and nutmeg are spices.

Here is an example of coreference involving dynamic ingredient sets:
INGREDIENTS
1 cup white sugar
¼ cup all-purpose flour
¼ teaspoon ground cinnamon
¼ teaspoon ground nutmeg
¼ teaspoon ground cloves
8 cups fresh or frozen blackberries, thawed
DIRECTIONS
COMBINE the first 5 ingredients in a large bowl; gently stir in blackberries . . .

In this case, the "first 5 ingredients" phrase of semantic type INGREDIENT is associated with the RecipeIngredients corresponding to:
1 cup white sugar
¼ cup all-purpose flour
¼ teaspoon ground cinnamon
¼ teaspoon ground nutmeg
¼ teaspoon ground cloves Additionally, the Ingestion Engine is configured to be able to use the pre-processing action(s) during ingredient co-reference, e.g.,
INGREDIENTS
4 potatoes, peeled and diced
¼ cup dry potato flakes
DIRECTIONS
In a large stock pot, combine water, chicken broth, chicken soup base, black pepper, carrots, diced potatoes, and onions . . . .

In this case, "diced potatoes" phrase of semantic type INGREDIENT is associated with the RecipeIngredient corresponding to:
4 potatoes, peeled and diced For each sentence in which a phrase of semantic type ACTION is identified, the Ingestion Engine is configured to go over each action phrase and constructs a cooking step associated with it.

For each action phrase the Ingestion Engine identifies an appropriate semantic frame. The frame needs to have its minimal required set of arguments present in the current sentential clause and in appropriate syntactic contexts. Additional, optional arguments from the selected frame of the action phrase are considered and all the required and optional frame arguments are mapped to slots of the output cooking step. The cooking step is added to the sequence (or graph) of cooking steps associated with the Abstract Recipe.

This may further be explained through the use of an exemplary sentence as might be found in the cooking directions of a Traditional Recipe: "Boil the potatoes in the large pot." shown in FIG. 23.

This may be analyzed as:
[Boil]: action the [potatoes]: ingredient in the [large pot]: container.

Ingredient co-reference processing may be employed to associate "the potatoes" with an Recipe Ingredient, say with id 5. Container co-reference may associate "large pot" (preceded by a definite article) with a previous mention of the pot and can provide an identifier for the container, say 9.

[Boil]: action the [potatoes]: ingredient-id-5 in the [large pot]: container-id-9

In this example, the action phrase "Boil" might result in the retrieval of a corresponding semantic frame:

```
BOIL-1
{
syn: [ROOT-root→@(lex: "boil")],
patient: {syn: [@-obj→(type: ingredient, id: I=get_id( ))]},
location*: {syn: [@-ppmod→(type: container, id: C=get_id( ))-case →(lex: "in")]},
duration*: {syn: [@-ppmod→(type: time, val: T=get_val( ))-case →(lex: "for")]},
steps: [{action_id: 3,
ingredient: I,
container: C<context: get_current_container_id( ),
time: T}]
}
```

A semantic frame is a data structure consisting of attributes and values, where the values may be atomic or have further structure.

In the above semantic frame, BOIL-1 is the name of the semantic frame, syn is a top level attribute specifying the syntactic context that licenses the use of the frame. In general it is a graph specifying a syntactic dependency structure with some nodes stating what lexeme(s) or even surface form(s) are needed. One particular node in the syntactic structure is designated as special (marked by '@'). It is to this node that the syntactic structures of the semantic arguments are connected. The above value for the syn attribute, [ROOT-root→@(lex: "boil")], states that a main verb "boil" is required and the other arguments are linked to it. patient, location, and duration are the semantic arguments of the action. A star after location and duration indicates that these arguments are optional.

Each of the semantic arguments specifies a syntactic structure identifying the argument (under the attribute syn). Type information for certain dependency structure nodes may require a phrase with that node as a dependency head of the required type.

For example, the patient attribute of the semantic frame has a value with a sub-attribute syn describing a dependency sub-structure, [@-obj→(type: ingredient, id: I=get_id( )], that needs to linked to the "boil" node. The 'get_id( )' function retrieves the identifier for the ingredient and assigns it to the variable 'I'. steps is the attribute specifying information from which the actual cooking step(s) are produced. In the above example, values of previously assigned variables are combined to give the structure of one step. The value for the 'container' (sub-)attribute of the 'step' attribute, 'C<context: get_current_container_id( )', is the value of the variable 'C' (which is the identifier associated with the container phrase in the syntactic trigger of the 'location' attribute) if the variable 'C' is set. However, because the 'location' attribute is optional (indicated by the star, 'location*'), the variable 'C' may not be set. In that case, the value will be retrieved from the current context by the function 'get_current_container_id( )'.

The Ingestion Engine is configured to suitably convert certain sentences from the cooking directions to tips, e.g., "For best results use cashew milk."
"Alternatively, use a small torch to caramelize the sugar."
"Alternatively, you can cut peppers in half vertically and stuff each half."
"After making the smoothie, take a second to rinse out the blender right after you use it, even if you're planning to wash it later; dried-on fruit makes for slow clean-up."

To decide which sentence to categorize as a tip, the Ingestion Engine uses a Machine Learning binary classifier.

The natural language engine then employs language rules in combination with the ingredients database 502, actions database 506, and the appliance model 508 to convert the recipe from a user readable form into an Abstract Recipe. It will be appreciated that as part of this process the natural language processing engine 1004 may seek to match actions, appliances and ingredients with previously stored actions, appliances and ingredients in the system. In the event that the Ingestion Engine matches all elements in a recipe with previously stored actions, appliances and ingredients, then the recipe may be processed completely into an Abstract Recipe.

In the event that phrases are identified in the Traditional Recipe that do not have a match against existing resources (ingredients, actions, appliances, tools, etc.), then these phrases (and the contexts in which they occur) will be flagged for the attention of a human for data entry. It will be appreciated that such human intervention may involve a human reviewing the missing phrase and adding an entry to the system for that phrase, whether it is an action, appliance or ingredient. It will be further appreciated that as missing elements are added, the need for human review is decreased.

The abstract recipe comprises a series of fields which are used to describe the recipe and basic characteristics. These may be as shown in the example recipe schema 1000 of FIG. 11A, which is partly populated with an example recipe, namely that having a recipe id of 67. Accordingly, an abstract recipe is simply a series of entries within fields in different tables.

The natural language engine is configured to automatically populate a number of the recipe fields. An example is identifying the number of servings the recipe is intended to produce, which is stored in the servings field. Other fields in the recipe are intended to be dynamic and populated on an ongoing basis, for example as users try out the recipe and rate it, like it or flag it.

A max_ratio and a min_ratio may also be populated. The values of the max_ratio and min_ratio indicate the maximum and minimum amount by which the recipe author believes the recipe may safely be scaled. Subsequently, the transformation engine may infer an actual maximum and minimum quantity using the density of the ingredients and the volume of the container. It will be appreciated that in the event that these result in a higher min_ratio or lower max_ratio that these may be adjusted according when presenting a recipe to a user.

Separately, the natural language processing engine processes the steps of the recipe into sequential actions. As referenced above, these are identified in FIG. 11A by the recipe being linked to step B 1102, step C 1104 and step D 1106 which are in turn identified in FIG. 11B, FIG. 11C and FIG. 11D. In practise, there may be several more steps in a recipe but merely three are shown for the purposes of illustration. Each step may include an action, an ingredient or other category. Thus, in the stored example of Step B identified in FIG. 11B, the id for the step is identified as having a value 1089, for a recipe identified as recipe_id 67, the type of step is identified as an action by the 'type' field, and the 'position' field having the value 1 identifies that this is the first step in the recipe. The action in question is identified by the action_id field value of 58, which is in turn identifiable from the actions database as meaning the action of "pre-heat" and having a temperature_id of 5 which in turn indicates a temperature in Fahrenheit of 350 or 175 in Celsius. Step B is identified as the first step in the recipe process by the value stored in the position field, i.e., 1 indicating it is the first step.

Thus, in the stored example of Step C shown in FIG. 11C, the id for the step is identified as having a value 1090, for a recipe identified as recipe_id 67, the type of action is identified by the 'action id' 'type' field as having an action_id as 58 which in turn is identifiable as the action "GET" with the item being got being of the type "bowl" and more particularly by the value of the 'to_container' field as being a "Large Mixing Bowl". The position field having the value 2 identifies that this is the second step in the recipe. It will be appreciated that the step translates into English as "get a large mixing bowl", however, language-specific information is stored separately from the abstract recipe. Similarly, the basic contents of the recipe are language agnostic, each step, ingredient, action, container, setting and appliance is merely identified by a code.

In the final step shown, stored example of Step D shown in FIG. 11D, the id for the step is identified as having a value 1090, for a recipe identified as recipe_id 67, the type is identified as an 'ingredient' with an ingredient_id of 187, corresponding to tomatoes. The amount value indicates the amount of tomatoes, e.g. as shown 2 for two tomatoes. The action is identified by the 'action_id' 'type' field as having an action_id 1 which in turn is identifiable as the action "ADD" with the container to which ingredient with ingredient_id 187 (tomatoes) is being added identified as that from step C, namely container ID number 15a7ca indicating that it is the "Large Mixing Bowl". The position field identifies that it is the third step in the recipe by the value stored in the position field, i.e., 3. It will be appreciated that the step is generated in English as "Add two tomatoes to a large mixing bowl", however, language-specific information is stored separately from the abstract recipe. The contents of an abstract recipe are language agnostic, each step, action, container, setting and appliance is merely identified by a code. Similarly, adverbs, prepositions, adjectives and plural and gender forms may be expressed in the abstract recipe form using codes rather than words.

The net result is that a recipe ingested in a first (source) language (e.g., English) may readily be reproduced in a form in a second (target) language (e.g., Spanish) without requiring a translator, merely that each of the individual elements are translated for the target language and that rules are present for combining them into target language sentences.

To this end and other purposes, it is desirable that the recipe database stores a record of each input user comprehensible recipe along with the associated automatically generated abstract recipe. In case of the record of the user comprehensible recipe, it may be an actual copy, or it may be the URL of where the recipe is available on-line.

Figure 12:
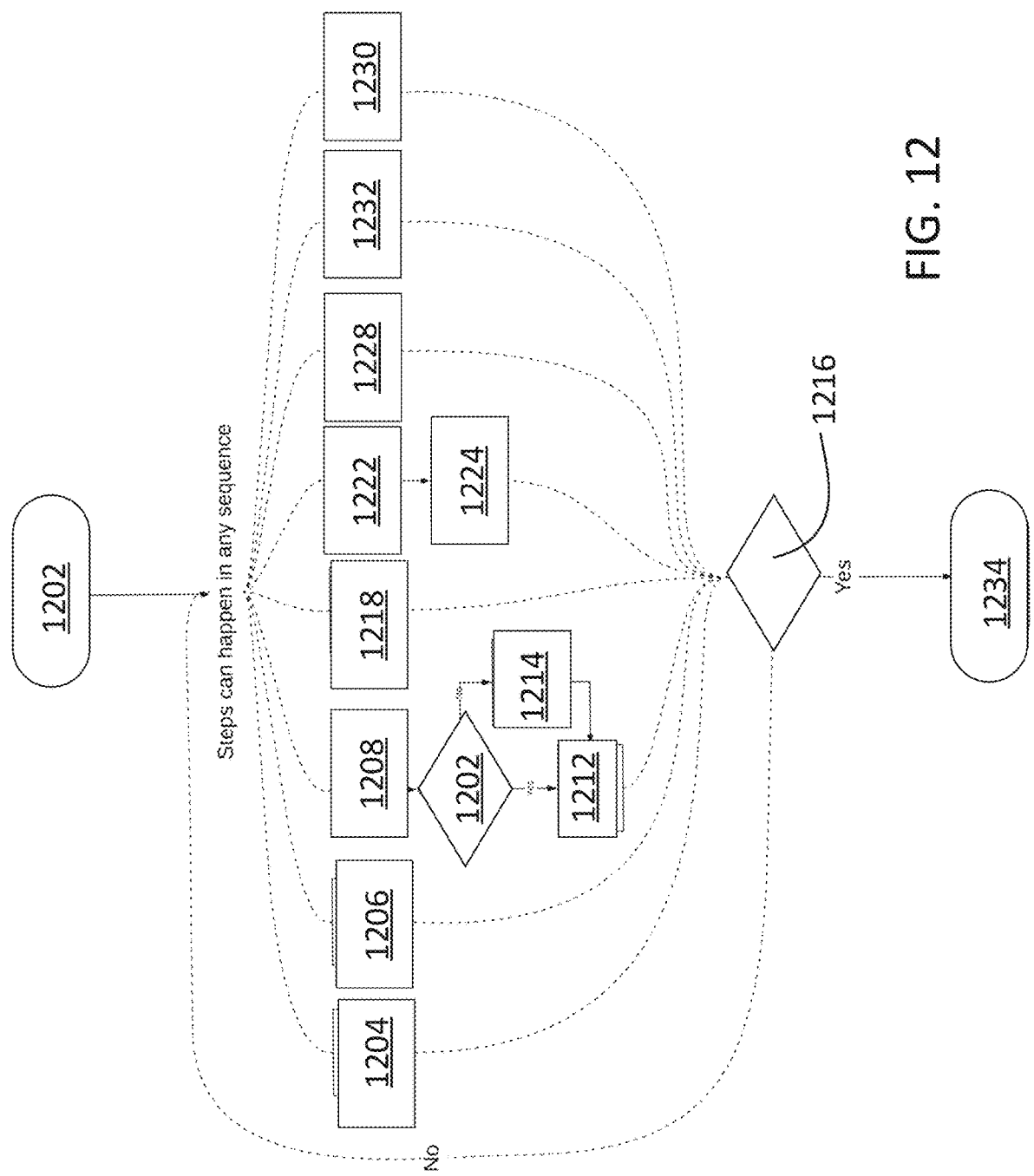
FIG. 12 represents an example flow for a recipe creator interface presented in FIG. 9.

As an alternative to the Ingestion Engine, the system may provide a recipe creator interface 906 allowing a user to manually enter a traditional recipe into the system. A flow chart 1200 for a recipe entry process is shown in FIG. 12 where the principal steps are shown in parallel meaning that the applicant may complete them in any particular order. The recipe entry process comprises an initial step where the user selects 1202 a recipe to convert. In this context, it is assumed that the user has a recipe they are working from.

After a recipe has been selected, there are a number of steps to be performed. As shown in FIG. 12, these steps of entering information associated with the recipe may be performed in any particular order until all of the required information has been entered. These steps are:

Setting 1204 a title for the recipe.

Defining 1206 the number of servings and providing a description of the recipe.

Identifying 1208 individual ingredients with the accompanying steps of checking by the system that the ingredient already exists in the database and if not requesting that the new ingredient be entered in the database. A check 1202 is made to determine if the ingredient does exist in the database. If the ingredient does exist in the database then the amount, units and other aspects are entered 1212. If an ingredient is not found, then a request may be made to create 1214 one. Such a request may include an identification of the new ingredient, along with characteristics of the ingredient, including for example, the density, colour and calories associated with the ingredient. The process may be repeated until all ingredients are entered.

Any container that is required for cooking the recipe may be chosen and named 1218. This may be repeated where there are multiple containers for a recipe.

At step 1222, a user can create an individual step in a recipe with an action, using ingredients, utensils adverbs and prepositions as required.

At step 1224, the user may optionally add one or more tips for the step.

As with other aspects, the user may repeat this process (steps 1222 and 1224) until all of the required steps in the recipe have been entered.

At any stage in the process, the user can preview 1228 the recipe.

A duration for cooking the recipe and difficulty of the recipe may be added 1230.

A hero image of the resulting dish may be added 1232.

These steps may be performed in any order and until all of the required information from the recipe has been submitted. Once a determination 1216 is made that this process is In a final step, the recipe is submitted 1234 for approval.

Once a recipe has been approved, it may be published on the system. Once published on the system, it is available for other users to view and cook.

The net result of the recipe creator 906 is the same as that of the ingestion engine, namely an abstract recipe where the recipe is stored as a series of entries in various fields of various tables of the database.

Once an abstract recipe has been created and stored and made available to users, a user may select it using the recipe interface, for example by searching using keywords or tags.

In this context, the process starts with a user accessing the DROP CLOUD server through a suitable user interface. This user interface may be provided by a recipe app installed on the user's computing device.

Figure 13:
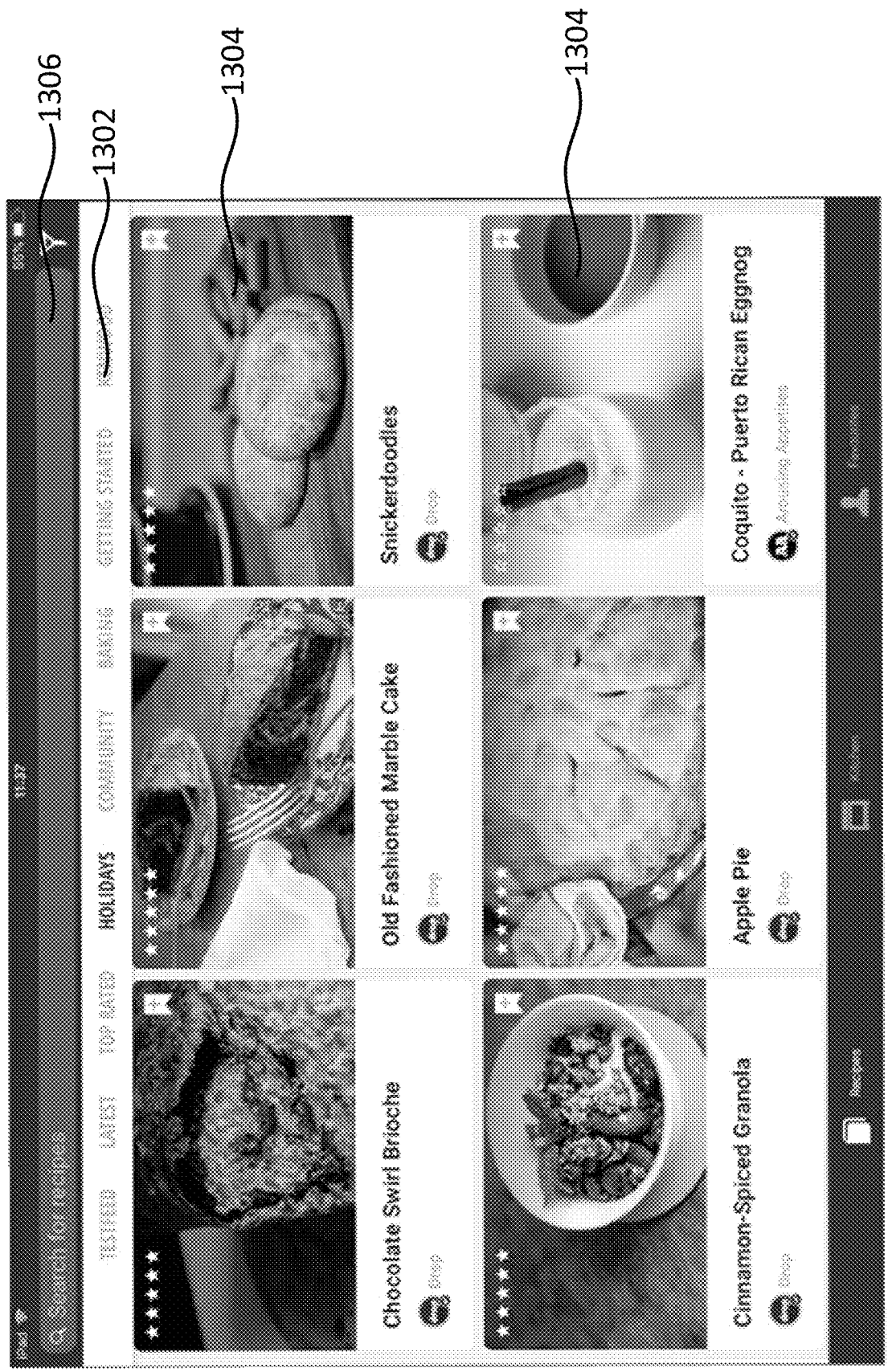
FIG. 13 is an example screenshot of a recipe app implementing functional aspects of the system of FIG. 5.

The graphical user interface allows a user to select a recipe from the recipes stored in the recipe database. An example of such an interface 1300 is shown in FIG. 13, in which a user is presented with several recipes 1304 on the screen of their device.

These recipes may be selected randomly, by rating, or using an appropriate recipe recommendation algorithm which considers the user's previous choices of recipe and determines ones that they might like now. At the same time, a user may select recipes by category with a list of categories shown in a category bar 1302. Examples of categories might include as shown "LATEST" recipes added and "TOP RATED" categories. A search bar 1306 suitably provided as shown at the top of the screen of the graphical user interface allows a user to search for recipes they might like by specifying search criteria.

Figure 14:
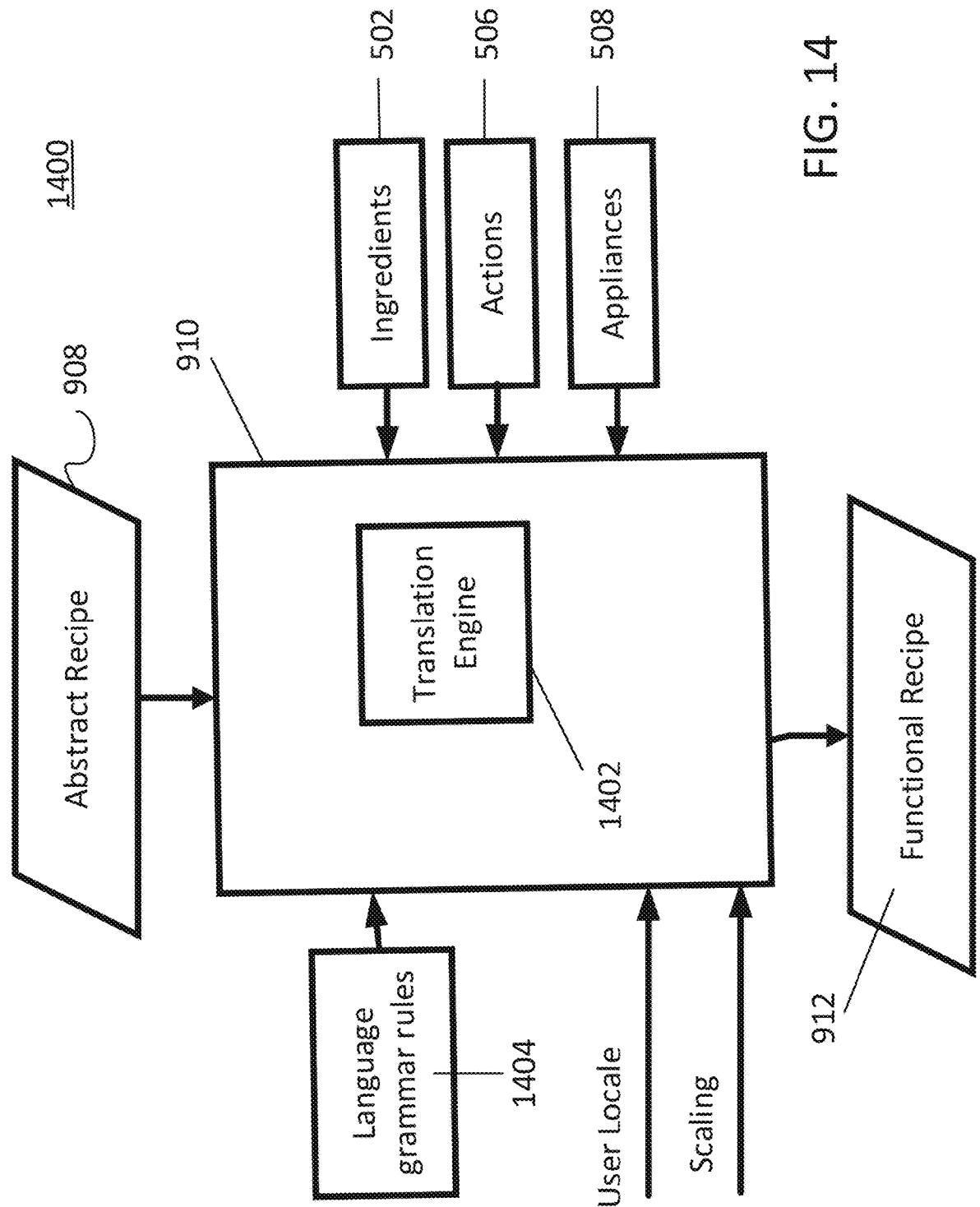
FIG. 14 is a representation of a transformation engine as presented in FIG. 9.

The transformation engine 910 is responsive to the selection of a recipe and retrieves the associated abstract recipe 908 as an input as shown in FIG. 14.

Once a recipe has been selected, the transformation engine 910 acts to transform the selected abstract recipe 908 into a functional recipe 912.

The transformation engine retrieves the various entries from the ingredients, actions and appliances databases and transforms the data extracted into structured recipe data. This structured data may be, for example, in the form of JSON, an example of which is shown in FIGS. 16A-16B which represents a section of an exemplary structured data in JSON.

The remaining aspects of the recipe model will now be explained in the context of a user employing a recipe in their kitchen.

Once a user has selected the recipe of interest, the user may set particular values to account for their requirements, e.g., the number of people to feed. An example of such a customization interface is shown in FIGS. 16A-16B. At the same time, the recipe generation engine which is suitably provided as part of the recipe app converts the structured data file into a on screen summary of the recipe which allows a user to see the ingredients, tools/appliances required and the steps in the process.

To adjust for quantity, each ingredient is suitably associated with a scaling exponent. For most ingredients the scaling exponent is 1 indicating a linear relationship. However, there are some ingredients where the scaling is otherwise, an example would be for raising agents, where the scaling exponent will be less than one. The scaling_exponent specifies the exponent, i.e., the power that the scaling factor must be raised to. Where the scaling exponent is 1, scaling works normally so a scaling ratio of 2 with a scaling exponent of 1 equates to 2¹=2. If the scaling exponent was 0.9, the final ratio is 2.9=1.866

The user may also customize the recipe based on their individual dietary requirements, for example allergies, vegetarian/vegan, etc.

The system may also have previously stored substitutions for listed ingredients. The system may be configured to create substitutions on a recipe by recipe basis. In one method, the authors identify the substitute ingredients as they are entering the recipe. In another, the authors are presented with possible substitutions by the system which they can accept or reject. Once accepted, the substitute ingredients are associated with the ingredients they are substitutable for within the recipe.

The exemplary system may also provide an ingredient substitution engine which employs a semantic database of ingredients role in types of dishes and associated possible substitutions. This may be employed to make suggestions to users. This may also be employed to make suggestions to authors for approval of substitutes within a recipe which if approved by the author are included within the recipe for all users. In the context of individual users, the ingredient substitution engine may include an ingredient recommendation algorithm which based on the user's dietary preferences and requirements selects an appropriate substitution. This substitution, if selected by a user, will be employed in the generation of the functional recipe described below but does not alter the earlier recipes in the model.

The transformation engine scales the quantities of the ingredients in accordance with the user setting. The transformation engine may also compare the action identifiers of the abstract recipe with action identifiers for appliances to identify appliances associated with the user which may be employed in individual steps of the sequence.

If there is no appliance associated with the user, a generic appliance may be identified for the user, e.g., "oven". Where there are appliances associated with the user which are associated with one or more actions of the recipe, the user interface may display information regarding the appliances to the user to allow the user make a selection of one or more appliances for the recipe.

Once these selections (if required) are received, the transformation engine employs the scaled ingredients and one or more selected appliances to transform the abstract recipe into a functional recipe which details the ingredients by their ingredient id and scaled associated measure and a sequence of steps to be followed including associating as required the one or more selected appliances with one or more individual steps in the sequence. The functional recipe is a logical flow with the identified actions and ingredients identified by the associated identifiers. Suitably, it also includes timing information.

A translation engine 1402 is employed by the transformation engine to populate the functional recipe with text which may be presented to the user. The translation engine recreates the individual steps in the locale of the user using a series of language grammar rules 1404 which select the correct words and adopt the correct grammatical form of the locale for the user. This allows the user to be presented with a localized form of the original recipe whatever the locale that recipe was created in.

Figure 15:
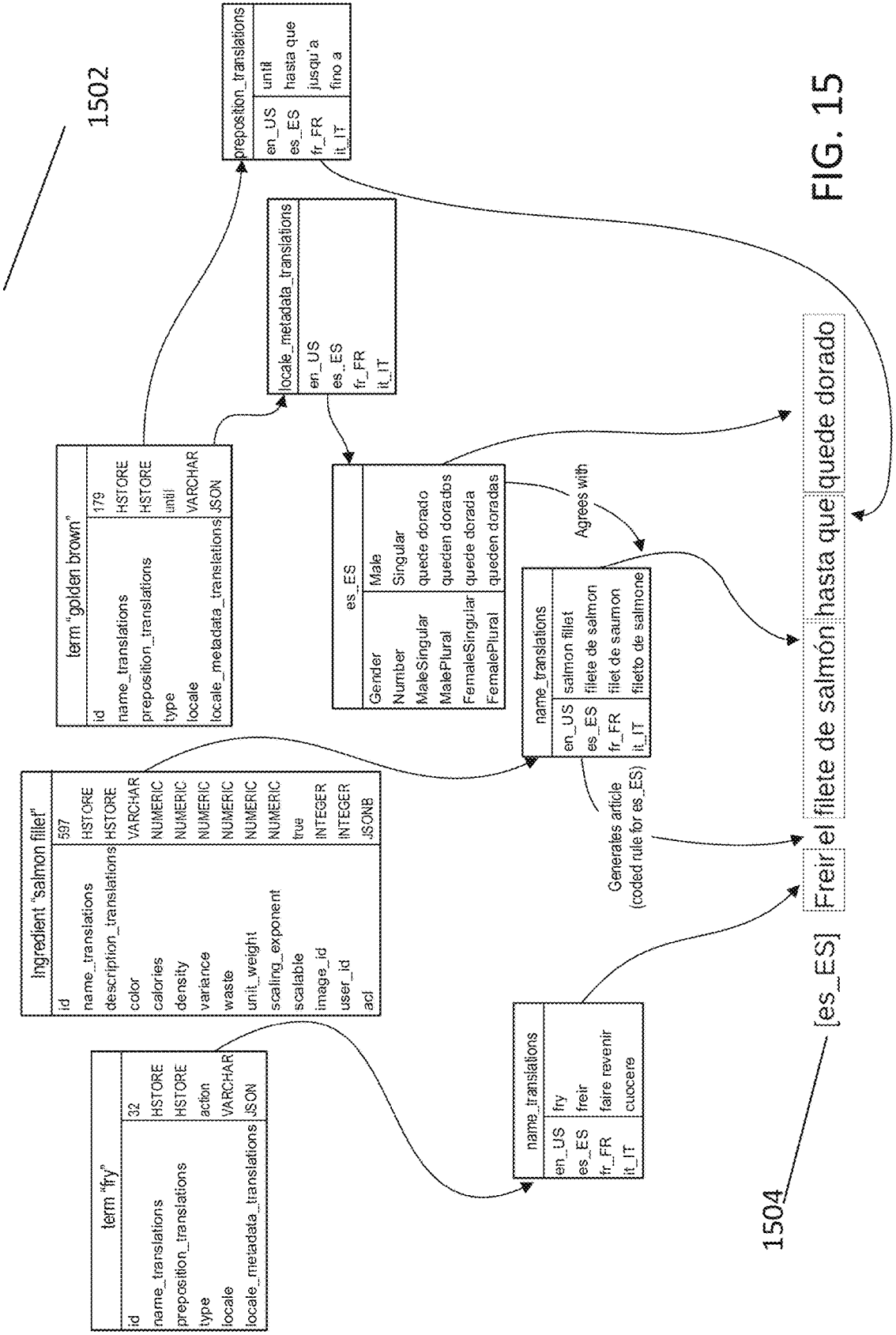
FIG. 15 is a representation of the construction of a step of a functional recipe from an abstract recipe by the transformation engine.

An illustration of the approach employed is shown in FIG. 15 in which an original step in a traditional recipe of fry the salmon fillet until golden brown was previously converted into a form 1504 with step in an abstract recipe as action_id 32 for "fry", with an ingredient id of 597 for "salmon fillet", action termination condition "golden brown" requiring the preposition "until".

The translation engine then employs a locale for the user, in this case Spanish (Spain), and constructs a form of the step using a combination of stored translations of words and specific rules for the locale which co-operate to generate the required step in Spanish for a user in Spain, i.e., Freir el filete de salmon hasta que quede dorado.

The translation engine does not use a strict mechanical dictionary translation but rather uses context in translation. In the particular example of FIG. 15, for the Italian equivalent, although the dictionary translation of 'Fry' in italian is 'Friggere', 'Cuocere' might be chosen as being more natural in this context.

Figure 17A:
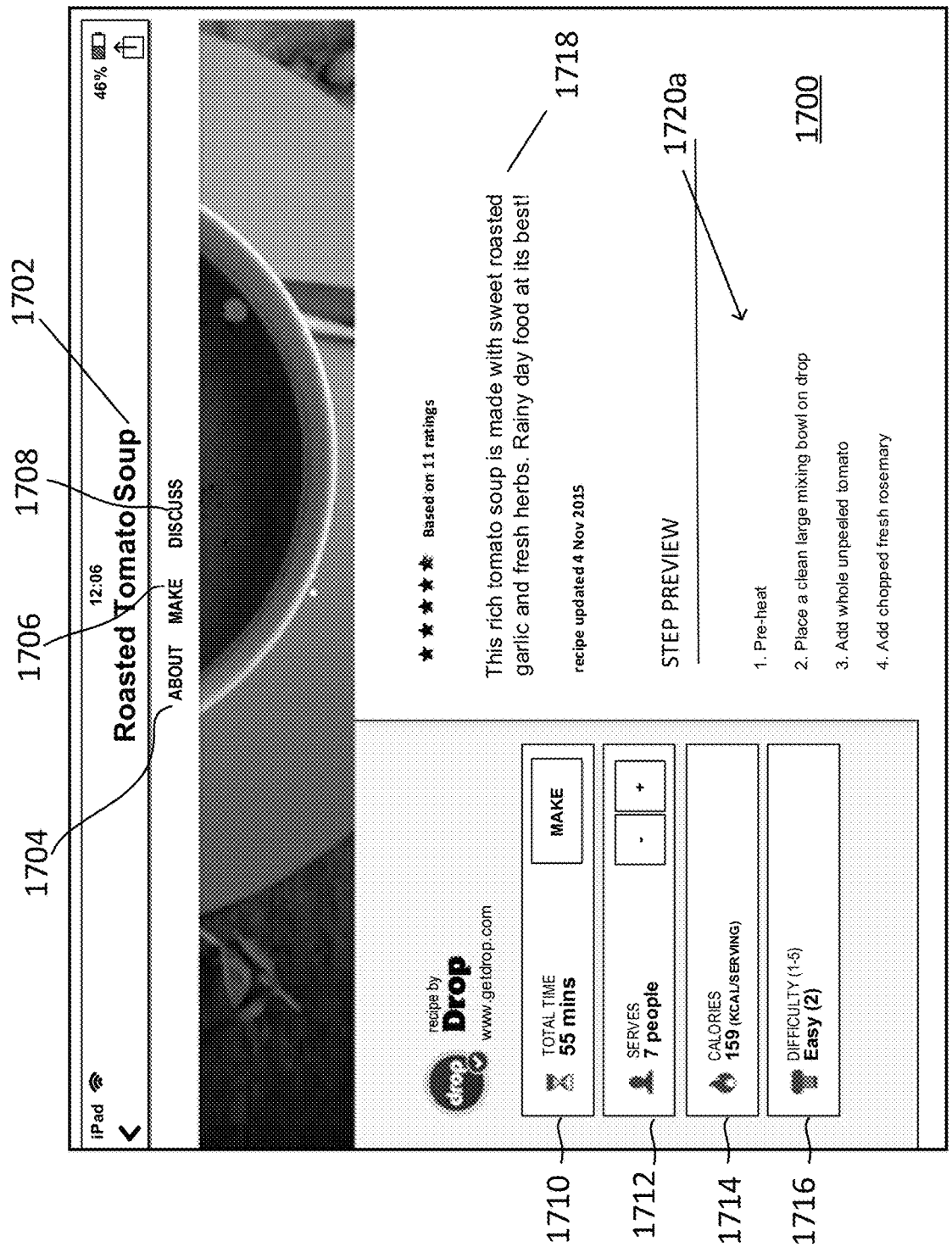
FIG. 17A to 17C are a representation of a tangible recipe presented to a user through a recipe app.
Figure 17B:
Figure 17C:
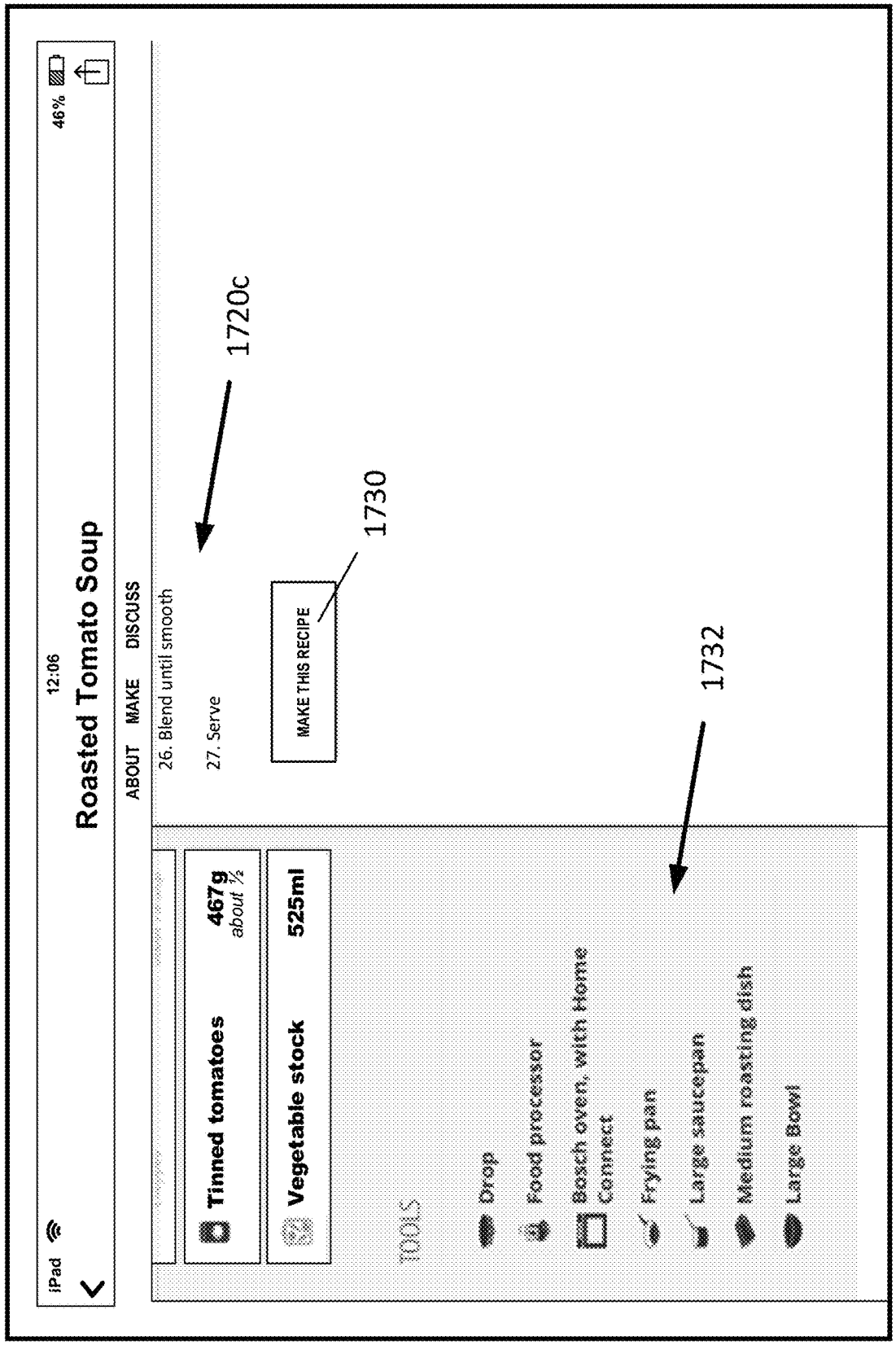

Once a recipe has been created, it may be selected and displayed to a user through a suitable graphical user interface. The recipe may be displayed in a preview form as illustrated in FIG. 17A to FIG. 17C. The preview form 1700 identifies the name of the recipe 1702, and provides controls allowing a user to move between different stages, namely preview form (ABOUT) 1704, following the recipe (MAKE) 1706 and to comment and discuss it with others (DISCUSS) 1708.

The preview form provides an interface that may, as shown, provide the user with an image of the finished recipe, a description of the recipe 1718, a preview of the steps 1720a-c. Controls are also provided within the interface to allow a user to adjust 1712 the number of servings required. Other information displayed includes a time 1710, calorie count 1714 and the level of expected difficulty 1716. Also displayed are the list of ingredients 1722. This may include images for each of the ingredients. Also displayed in the list of tools 1732 (containers and appliances) required to make the recipe.

Figure 18:
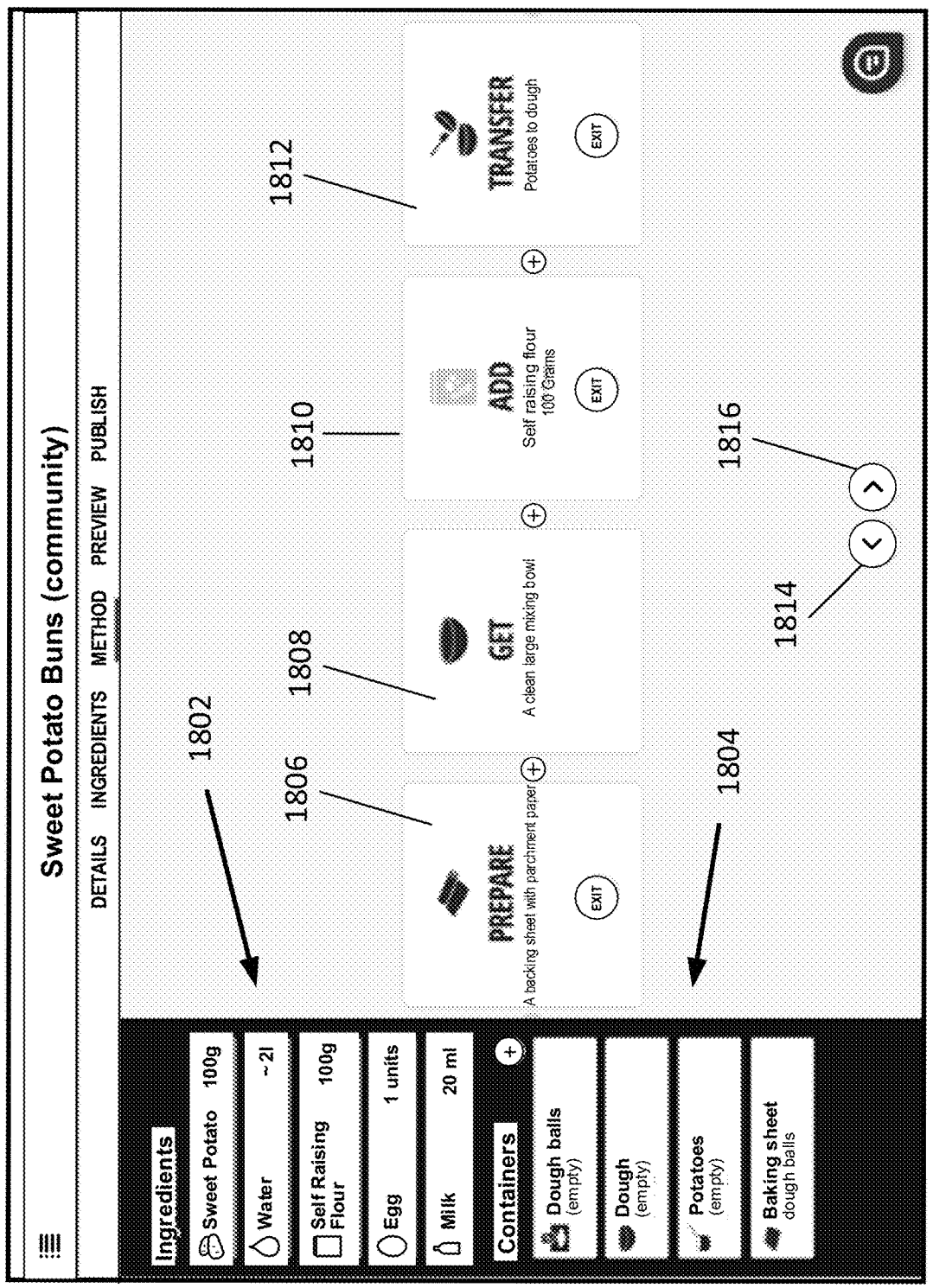
FIG. 18 is a representation of a tangible recipe in a form which makes it easy for a user to progress through the recipe in steps.

A button or other control 1732 may be provided at the bottom allowing the user to switch from the preview interface to an interface, as shown in FIG. 18, having a tangible recipe 1800 which is presented to the user with the sequential flow of steps 1806, 1808, 1810, 1812 to be followed. Also presented are the ingredients 1802 and the containers 1804. Each ingredient is identified with a logo or image which is reproduced within the step when required. Equally containers are identified with a logo or image and when a container is used in a step, the image/logo is shown within the step. Suitably, the steps may be scrolled through using controls 1814, 1816 as required.

The tangible recipe generation engine may include audio, video and photo content associated with the individual ingredients, actions, identified appliances or a link to the original tangible recipe.

Equally, the user comprehendible series of sequential steps may be presented to the user as a sequence of spoken instructions which may be played as audio from the user's computing device. In certain arrangements, this audio may also be presented to the user through the appliance.

The user's computing device may be responsive to voice instructions in which case the user can request each instruction in sequence as they progress through a recipe.

It also is possible for a user to switch between user computing devices mid recipe. In this manner for example, a user could initially be reviewing the recipe on the screen of a tablet device, which is convenient for assembling ingredients, and once the user commences the steps of the recipe, they may switch to a different computing device which is audio enabled computing device with voice commands such as an Amazon Echo device so that they can progress through the recipe instructions without having to touch the screen of the tablet device.

Similarly, the system may be configured to display the steps on a cooking appliance that the user is employing for the recipe.

At the same time, the recipe app may instruct connected kitchen appliances to perform functions as the user progresses through the tangible recipe.

In this context, for a user to control an appliance, they must pair the appliance with their user account. The security model involves the user having to provide a token that is provided by the appliance after issuing a pairing instruction with its built in interface. This mechanism identifies that the user has physical access to the appliance. For some appliances, this takes the form of a PIN displayed on the appliance, that the user must enter into the app to perform pairing. Alternatively pairing may be by providing a scannable identifier, e.g., barcode, QR code or RFID.

There may be different methods of establishing connections between the system, users and connected appliances. Thus, as an example, real-time events server 5 may act as a router for commands and messages between connected appliances and users. Some appliances, like the DROP™ scale, are connected directly to client apps instead. Some appliances have their own real-time API, and a machine-to-machine (MTM) connection may require to be made between the two servers. In the simplest case, the appliance authenticates to the events server and establishes a persistent two-way network connection for receiving commands and sending back acknowledgements, status updates, and error notifications.

Although, the abstraction of recipes into a form that cannot be directly interpreted by a user appears to add unnecessary steps, by doing significant advantages accrue.

Specifically, the integration of the recipe model with the appliance model makes it possible to:
Reduce significant waste by ensuring that a user can scale a recipe to their needs or available ingredients.
Eliminate the need for user interfaces at each of the appliances.
Control the appliances from the recipe in a user centric approach.
Develop a scaling model for efficient generation of recipes.

The integration changes the way the appliance works. The appliance model uses a more granular descriptive terminology than previous approaches which allows for different appliances and different manufacturers to be easily introduced into the system by entering details of the appliance in the appliance model. Thereafter, it is immediately compatible and may be presented and used with existing recipes.

At the same time, the user interacts with the recipe and the user's appliances through an app on their phone or other computing device ensuring that the recipe steps and appliances are sequenced properly.

The detailed appliance model empowers the user to select exactly the right appliance, and to carry out any particular task through the app. This higher level of granularity in the appliance model empowers the user to instruct the appliances on what to do, using a more granular understanding of the state of the machine to inform decisions on the suitability of the appliance to carry out a particular task.

As used in this application, the recipes may be considered as adaptive or dynamic recipes because they are not fixed but instead they adapt to the cultural context, to the specific kitchen appliances context and to the user preferences. The recipe is dynamic in the sense that it changes based on the user's preferences and the connected kitchen appliances available.

An appliance table is used to store information regarding the types of appliances. For example, the appliance table contains data required to represent the (type of) appliance in the client apps, i.e., localized name, icon, icon color.

Connected appliances also have a driver-code running in the events environment which provides a hardware abstraction layer (HAL). By abstracting the differences between manufacturers' APIs and devices under a unified HAL, our existing clients automatically support new appliances by supporting the HAL. Finally, connected appliances are individually represented in the device registry table.

Each appliance has its own definition of settings in its driver. Some of these settings are scalar (i.e., temperature, time) and others are enumerated (i.e., "slow", "medium" and "fast"). The HAL abstracts similar appliances settings, allowing, for example, for ovens to be used interchangeably in recipes.

The user appliances table associates the device registry with the user table. Additionally, both containers and appliances are grouped by manufacturer and thus may be enabled or disabled from different org groups in the user database. The system offers granular control about whether an appliance/container can be used and/or can be listed under a specific organization (tenant) in the system.

The transformation engine may also identify the actions in the abstract recipe and compares these with the actions available for appliances associated with the user. This allows the transformation engine to present choices of appliance to the user to allow them to select an appliance for use in following the recipe. The capabilities afforded by an appliance allow the transformation engine to choose another appliance to meet the required capability: for example, turning a traditional stew recipe that uses a pot on a stove, to a recipe that is made in a pressure cooker, or cooking food processor. The choice of appliances is suitably presented to the user through the same user interface.

At the same time, there is an appliance interface responsive to the user progressing through the steps of the tangible recipe, the appliance interface being configured to activate/control an appliance associated with a step in the tangible recipe as the user progresses through the steps.

Figure 19:
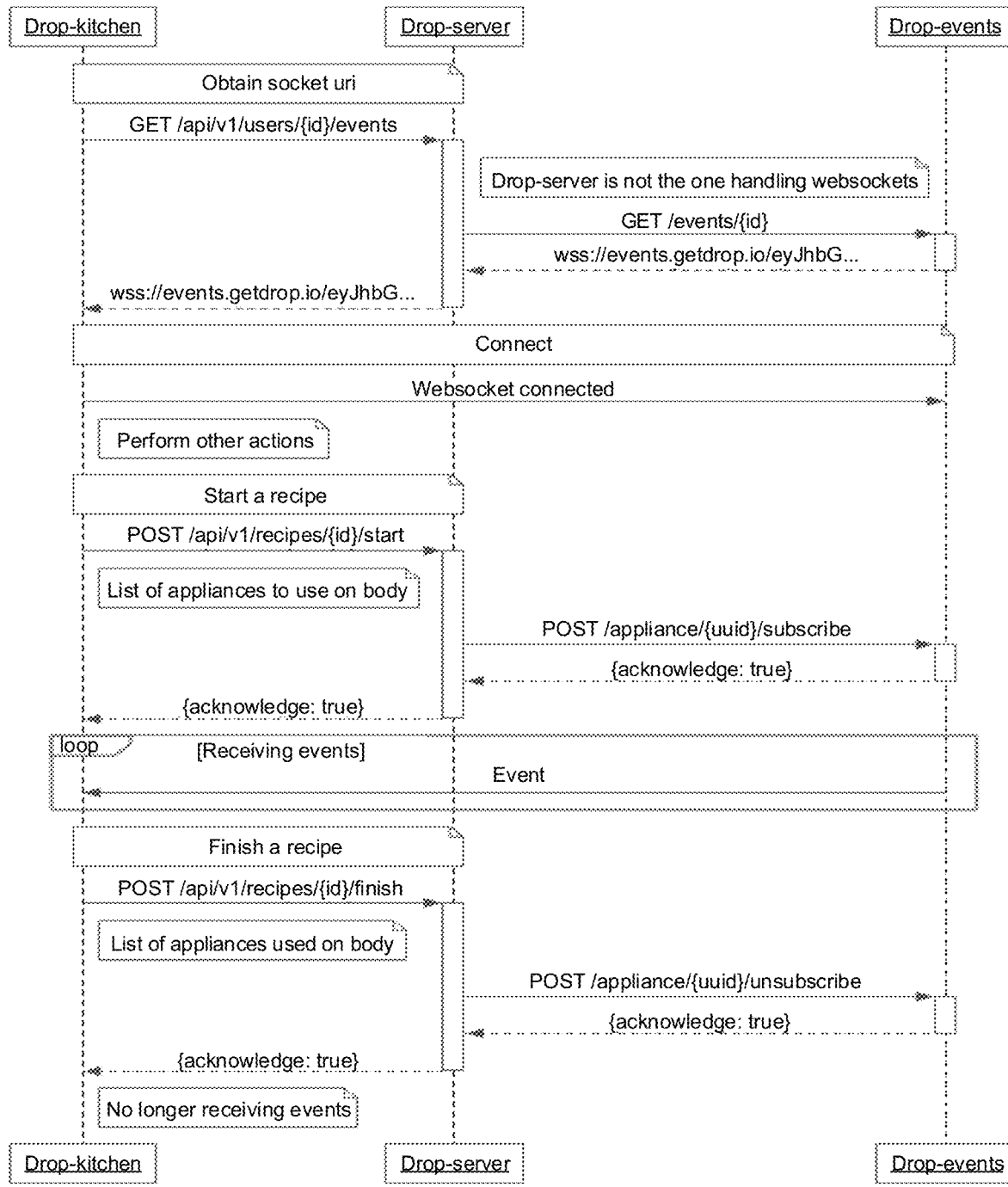
FIG. 19 is an example of interactions between a recipe app, an application programming interface (API) server and an events server of the system.

As a user progresses through the recipe, certain steps contain a URI that may be accessed to activate the relevant appliance with the settings for this step. Making a network request to this step URI generates an appliance command from the events server with a response received from the user Web Socket as shown in FIG. 19.

Figure 20:
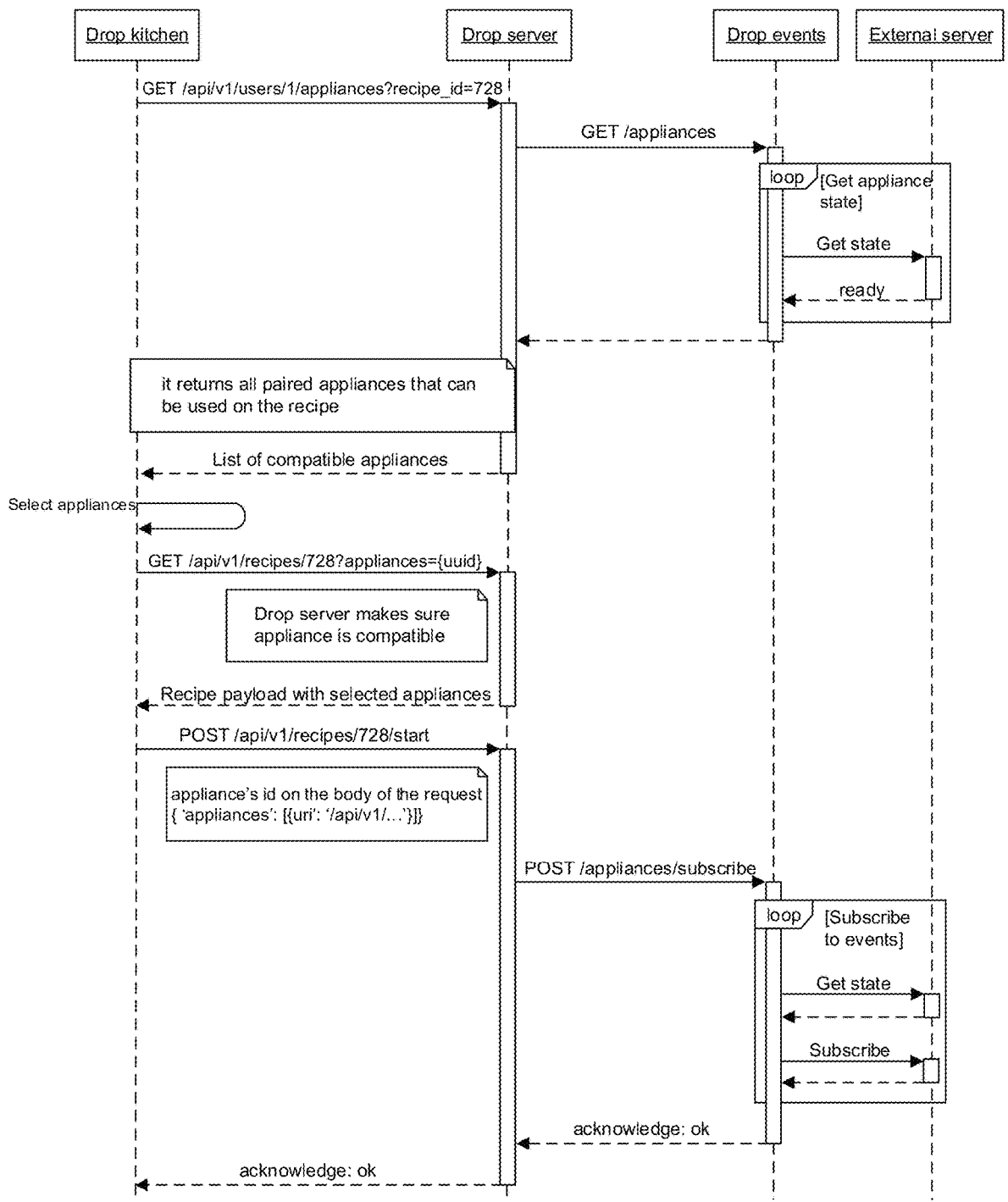
FIGS. 20(A)-20(C) are an example of the interaction during progression of a recipe where there is a direct web connection between the events server and a connected kitchen appliance.
Figure 20:
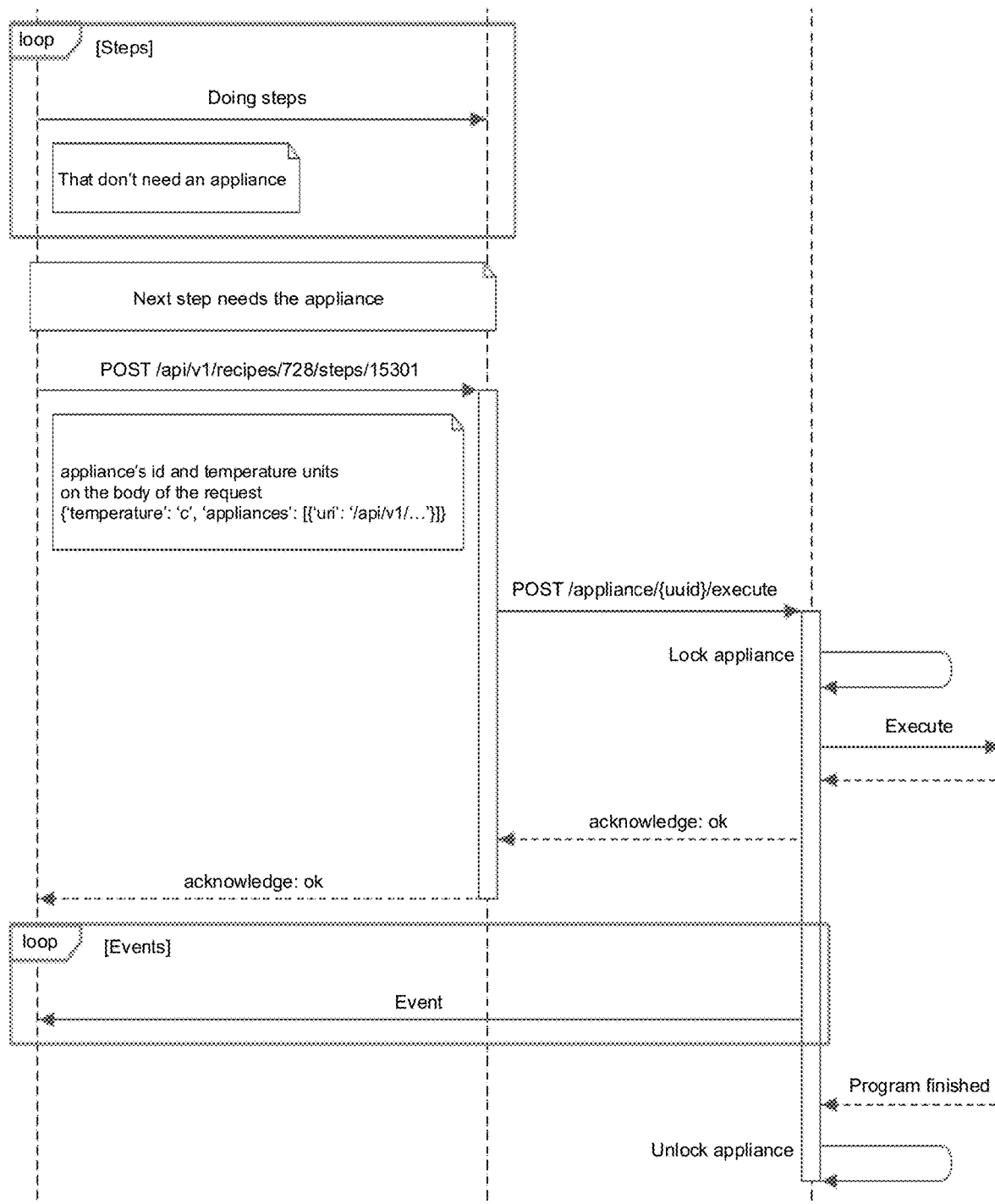
Figure 20:
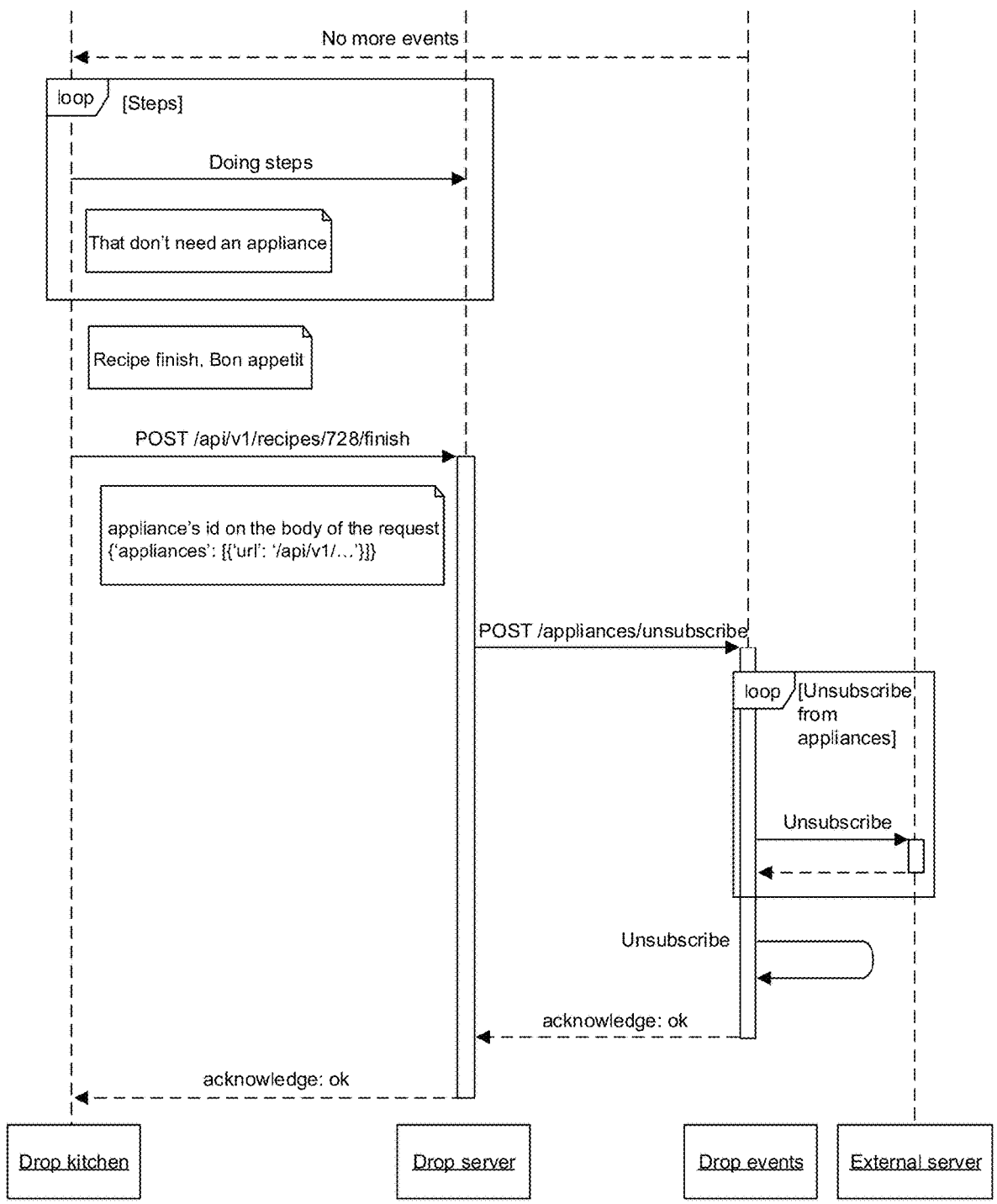
Figure 21:
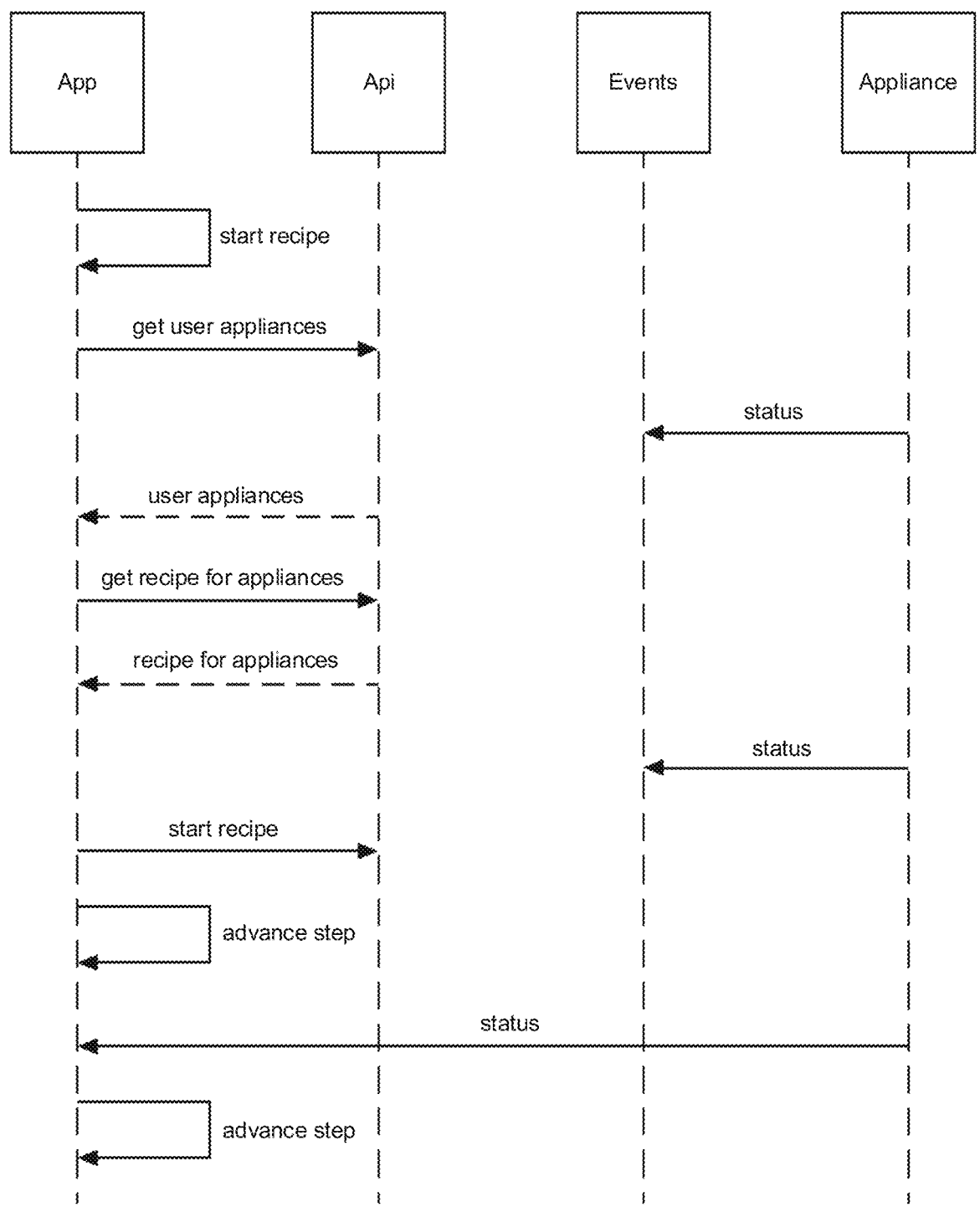
FIGS. 21(A)-21(B) are an example of the interaction during progression of a recipe where the connection between the events server and a connected kitchen appliance is via a third party server.
Figure 21:
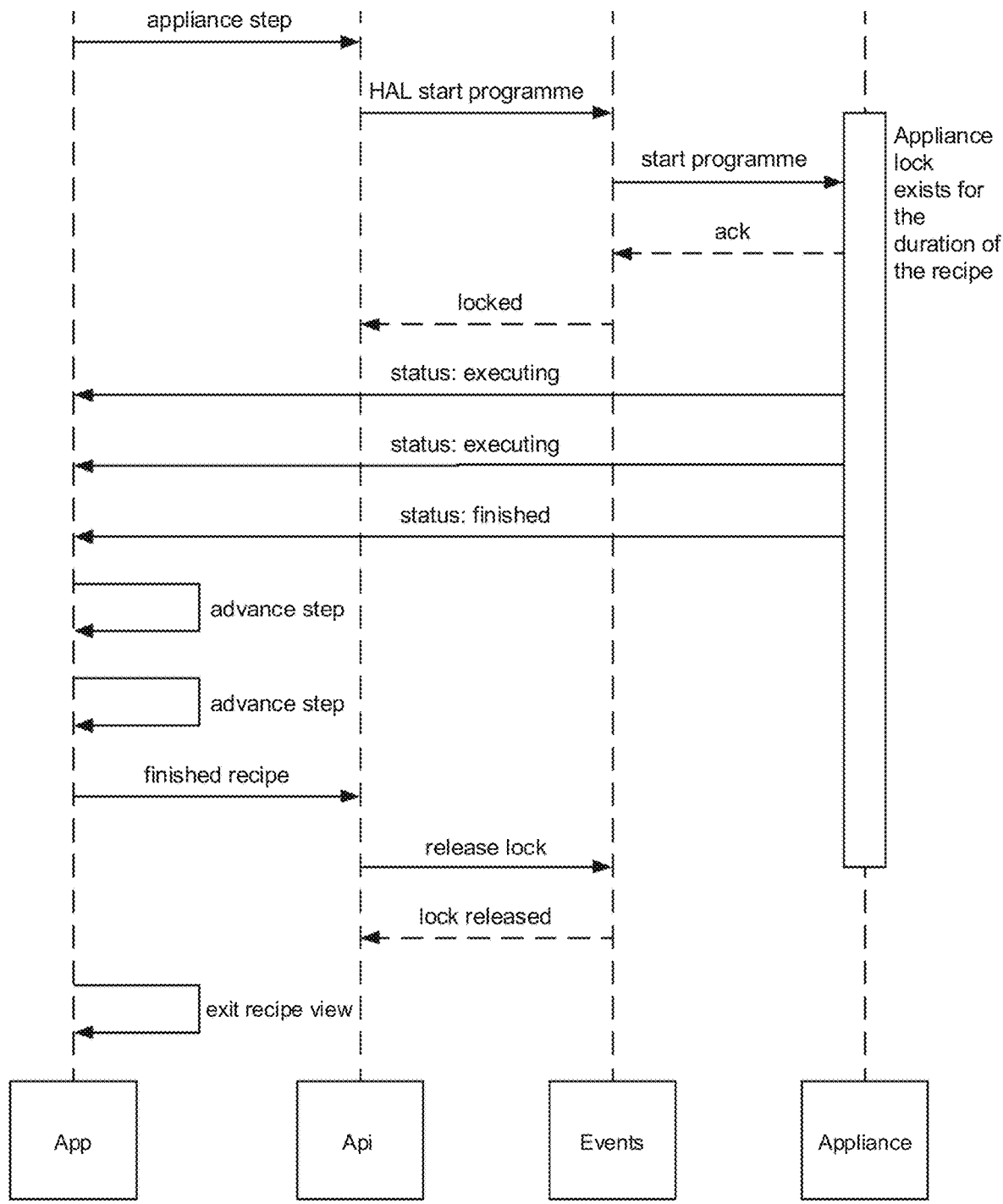

An exemplary interaction between the recipe application on a user's computing device, the API, the events server and an appliance is illustrated in FIGS. 20(A)-20 (C) in the situation where there is a direct connection between the appliance and the events server. FIGS. 21(A)-21(B) illustrates the flow where the appliance is controlled through an external server associated with the appliance.

As described above, the present system provides dynamic recipes which allow for the final recipe presented to be in a form which can account for, for example:

User preferences.
Availability of kitchen appliances and their specific capabilities.
Language preferences.
Recipe format preferences.

The transformation engine 910 narrates the flow within a tangible recipe, which is then followed by the user. The translation engine ensures that this narration is adapted to the user, in an automatic process.

The invention enables a guided cooking experience, where recipes are empowering, as:

Every recipe is culturally and linguistically appropriate for the user.
Every recipe is adapted to the preferences and capabilities of the cook and the kitchen.
Each cooking step is clearly communicated and understandable by the user.
The user experience is smooth and enjoyable.

The integration of the recipe model with the appliance model enables personalization of the recipes to the available appliances and their capabilities. At the same time, as ingredients may be categorized according to allergenic or dietary circumstances, it allows users to easily search the database without having to see recipes that are not appropriate for their allergenic or dietary circumstances.

The database of ingredients and terms, and the appliance database, store language-specific information, including for example gender and number for each language paired with every ingredient. This pairing allows the translation engine to output translations in the target language. More specifically, by using language grammar rules and data from the unique IDs of the individual ingredients and appliances, the translation engine can construct action step sentences that read smoothly—even when ingredient substitutions, quantity adjustments, and different appliances are factored in.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by processor(s) (e.g., working in connection with operating system(s)) to facilitate the functions as described herein. In this regard, the program code may be implemented in any desired language, and may be implemented as machine code, assembly code, byte code, interpretable source code or the like (e.g., via Java, Scala, Python, JavaScript, C, C++, PHP, Go, Objective-C, R, Prolog, Lisp, etc.). In some embodiments, the computer program product may be part of a cloud network of resources.

Figure 22:
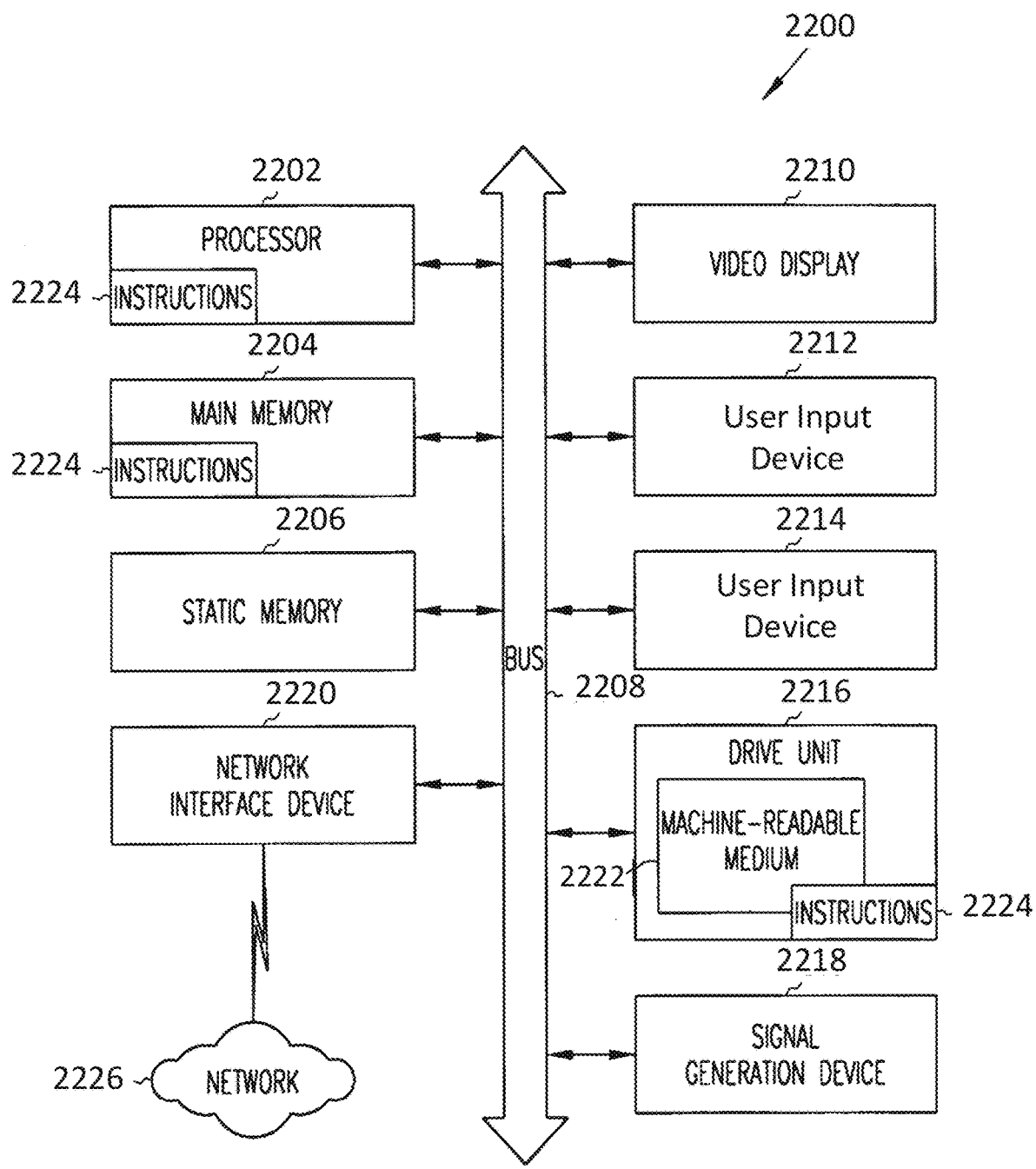
FIG. 22 is an example of a computing device suitable for implementing one or more aspects of the system.

FIG. 22 shows a diagrammatic representation of machine in the example form of a computer system 2200 within which a set of instructions, for causing the machine to perform any one or more of the methodologies discussed herein, may be executed including both the server and user computing devices of the application. The machine operates as a connected (e.g., networked) device to other machines. When implemented as the client computing device, it is likely to be a personal computer (PC), a tablet PC, a set-top box (STB), a Personal Digital Assistant (PDA), a cellular telephone, a wearable device, or any machine capable of executing a set of instructions (sequential or otherwise) that specify actions to be taken by that machine.

Further, while only a single machine is illustrated, in the context of the server the machine may be implemented within a cloud architecture and accordingly the term "machine" shall also be taken to include any collection of machines that individually or jointly execute a set (or multiple sets) of instructions to perform any one or more of the methodologies discussed herein.

The example computer system 2200 includes a processor 2202 (e.g., a central processing unit (CPU) a graphics processing unit (GPU) or both), a main memory 2204 and a static memory 2206, which communicate with each other via a bus 2208. The computer system 2200 may further include a video display unit 2210 (e.g., a liquid crystal display (LCD)). The computer system 2200 also includes one or more user input devices 2212, 2214. These user input devices may, for example be one of but not limited to, an alphanumeric input device (e.g., a keyboard—which may be a physical one or a virtual one presented on the display), a cursor control device (e.g., a touch screen or a mouse), a microphone and software responsive to voice commands received by the microphone, a gesture detector which may for example be implemented using a camera and associated software for detecting a gesture when a user is in the frame of the camera. The computer system suitably further comprises electronic or magnetic storage 2216, a signal generation device 2218 (e.g., a speaker) and a network interface device 2220 which in turn may be a radio interface allowing a connection with a mobile telephone network in the case of the client computing device.

The storage 2216 includes a machine-readable medium 2222 on which is stored one or more sets of instructions (e.g., software 2224) embodying any one or more of the methodologies or functions described herein. The software 2224 may also reside, completely or at least partially, within the main memory 2204, within the processor 2202 and/or graphics processing unit during execution thereof by the computer system 2200, the main memory 2204 and the processor 2202 and the graphics processing unit also constituting machine-readable media.

The software 2224 may further be transmitted or received over a network 2226 via the network interface device 2220.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternative embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Certain terms are used throughout the description and following claims to refer to particular components. As one skilled in the art will appreciate, electronic equipment manufactures may refer to a component by different names. This document does not intend to distinguish between components that differ in name but not function. It should be emphasized that the term "comprises/comprising" when used in this specification is taken to specify the presence of stated features, integers, steps or components but does not preclude the presence or addition of one or more other features, integers, steps, components or groups thereof. Also, as used in the specification including the appended claims, the singular forms "a", "an", and "the" include the plural unless the context clearly dictates otherwise.

Use of directional terms such as "upper", "lower", "above", "below", "in front of", "behind" etc. are intended to describe the positions and/or orientations of various components of the invention relative to one another as shown in the various Figures and are not intended to impose limitations on any position and/or orientation of any embodiment of the invention relative to any reference point external to the reference.

While the invention has been particularly shown and described as referenced to the embodiments thereof, those skilled in the art will understand that the foregoing and other changes in form and detail may be made therein without departing from the spirit and scope.

What is claimed is:

1. A system for use with connected kitchen appliances comprising:

one or more devices, each comprising a processor and a memory, the devices further comprising:

an ingredient database storing information for a plurality of ingredients and identifying each ingredient with a unique ingredient identifier;

an action database storing a plurality of actions performable by at least one of a user or one of a plurality of kitchen appliances and identifying each action with a unique action identifier;

an appliance database storing information for a plurality of the kitchen appliances, each of the kitchen appliances connected or not connected to a network, and identifying each appliance with a unique appliance identifier, the appliance database further associating each kitchen appliance with one or more of the action identifiers from the action database, each associated action identifier identifying the action for which the kitchen appliance may be used;

an ingestion engine configured to receive one of a plurality of user-comprehensible recipes and to convert the recipe into an associated abstract recipe, the associated abstract recipe comprising a data structure that comprises an ingredients list in which each ingredient is identified by that ingredient's associated ingredient identifier from the ingredient database and attributed a quantity, and a recipe sequence, wherein the recipe sequence identifies individual steps in the user-comprehensible recipe, wherein each step in the sequence is associated with the action identifier from the action database identifying one or more of at least one of the actions to be performed in the individual step, an ingredient id with an associated measure for the step, one or more container ids, an appliance id with associated appliance parameters, or at least one of multimedia data and virtual reality data that illustrate a performance of one of the actions;

a recipe database storing a reference to the user-comprehensible recipe and the associated abstract recipe;

a user interface providing a graphical user interface allowing a user to at least one of select a recommended one of the user-comprehensible recipes stored in the recipe database, or to select one of the user-comprehensible recipes from search results after performing a recipe search against the recipe database with appropriate search criteria, and to provide a desired output measure;

a transformation engine responsive to the user selection of the user-comprehensible recipe, the transformation engine retrieving the associated abstract recipe as an input, the transformation engine using the desired output measure to scale the associated measure for each ingredient, comparing the action identifiers associated with the abstract recipe with action identifiers associated with the kitchen appliances to identify the kitchen appliances which may be employed in the individual steps of the sequence, and employing the scaled ingredients and one or more selected appliances to transform the abstract recipe into a functional recipe which details the ingredients by their ingredient id and scaled associated measure and a sequence of steps to be followed including associating as required one or more selected appliances with one or more individual steps in the sequence;

a tangible recipe generation engine accepting the functional recipe and converting the functional recipe into a tangible recipe comprising a user-comprehensible list of ingredients with appropriate measures for the user, the tangible recipe comprising a user-comprehensible series of sequential steps, wherein the tangible recipe is presented on the user interface; and an application programming interface to allow at least one networked device connected to the network to operate based on the tangible recipe.

2. A system of claim 1, wherein the ingestion engine employs a natural language processing engine which parses unstructured or semi-structured representations of recipes, textual/audio/video/multimedia or a combination thereof, into a sequence or graph of steps with elements, wherein the elements comprise ingredients, actions, action parameters, action termination conditions, action manner, tools or appliances and each of these elements contain corresponding identifiers.

3. A system of claim 2, wherein at least one of:
the ingestion engine is configured to identify measures in the locale of the recipe and to convert them into a standardized measure; and
the standardized measure is one of weight.

4. A system according to claim 1, wherein the transformation engine is also configured to identify whether accessories are required for an identified appliance and to include details of these accessories to be presented to a user within the functional recipe and wherein the tangible recipe generation engine presents these to the user.

5. A system according to claim 1, further comprising a user database, the user database identifying any of the kitchen appliances associated with the user.

6. A system according to claim 5, wherein the identified appliances are in turn provided to the user interface for display to the user to allow the user to make a selection of one or more appliances for the recipe where there are alternatives available.

7. A system of claim 1, wherein the tangible recipe generation engine is one of multiple tangible recipe generation engines and wherein the user may have the multiple tangible recipe generation engines, each of the multiple recipe generation engines operating on a different computing device, wherein the system is configured to synchronize progress across the multiple recipe generation engines as the user progresses through the steps of the selected recipe.

8. A system of claim 7, wherein the user can switch control between each of the multiple recipe generation engines and devices.

9. A system of claim 8, wherein the switching of control is performed in response to the user presenting a command to a recipe generation engine.

10. A system of claim 9, further comprising:
a first computing device having a first one of the tangible recipe generation engines responsive to a physical input interface present on the first computing device, and
a second computing device having a second tangible recipe generation responsive to a voice command interface on the second computing device and wherein switching of control is effected by a user presenting a voice command to the voice command interface.

11. A system of claim 1, further comprising:
an appliance interface responsive to the user progressing through the steps of the tangible recipe, the appliance interface being configured to activate one of the kitchen appliances associated with one of the steps in the tangible recipe as the user progresses through the steps.

12. A system of claim 11, wherein the activated appliance has a display and the system is configured to present the steps of the tangible recipe on the display of the activated appliance as the user progresses through the tangible recipe.

13. A system of claim 5, further comprising:
an accessory database storing information regarding a plurality of accessories and identifying each accessory with an accessory identifier and associating that accessory with an appliance identifier, the accessory database further associating each accessory with one or more actions which may be performed by the accessory, wherein the user database further identifies any accessories associated with the user and wherein the transformation engine further compares the action identifiers of the abstract recipe with the action identifiers for the accessories to identify accessories which may be employed in individual steps of the sequence, wherein the identified accessories are in turn provided to the user interface for display to the user to allow the user to make a selection of one or more accessories and where the transformation engine employs the selection of accessory in the formulation of the functional recipe and the sequence of steps to be followed includes associating as required the one or more selected accessories with one or more individual steps in the sequence.

14. A system of claim 1, wherein at least one of:
the information stored in the ingredient database for each ingredient identifies a density for each ingredient, a volume for each and a calorie content for each ingredient and wherein the transformation engine employs one or more of these values when scaling the associated measure for each ingredient; and
the settings for a user identify at least one of a language and a locality.

15. A system of claim 5, wherein the user interface is configured to allow a user to add to the system or remove from the system any appliances or accessories that they have wherein the user interface is configured to update user associations in the user database.

16. A system of claim 1, further comprising:
a media database, wherein the media database stores a plurality of media items, comprising one or more of images, sound/audio clips or videos, wherein each media item is associated with one of the ingredients, one of the steps, one of the actions of one of the kitchen appliances, one of the kitchen, an accessory, a container, the abstract recipe, and wherein the tangible recipe generation engine is configured to integrate one or more of the media items with the tangible recipe.

17. A system of claim 1, wherein at least one of:
the appliance interface is configured to operate in a first mode where the appliance is activated by a communication link established directly between the appliance interface and the appliance using a web communication; and
the appliance interface is further configured to operate in a second mode where the appliance has an established web connection to a server associated with the manufacturer of the appliance and the appliance is activated by an instruction sent from the appliance to the server associated with the manufacturer.

18. A system according to claim 17, wherein the appliance interface is further configured to operate in a third mode in which the appliance has a communication link established locally with a user device, the user device having a display on which the graphical user interface is presented to the user, wherein the appliance interface activates the appliance using the local communication.

19. A non-transitory computer-readable storage medium comprising instructions that, when executed, cause at least one processor to at least:

> store information for a plurality of ingredients and identifying each ingredient with a unique ingredient identifier in an ingredients database;
> store a plurality of actions performable by at least one of a user or a one of a plurality of kitchen appliances and identifying each action with a unique action identifier in an action database;
> store information for a plurality of the kitchen appliances, each of the kitchen appliances connected or not connected to a network, and identifying each appliance with a unique appliance identifier in an appliance database;
> associate each kitchen appliance with one or more of the action identifiers from the action database in the appliance database, each associated action identifier identifying an action for which the kitchen appliance may be used;
> receive one of a plurality of user-comprehensible recipes and converting the user-comprehensible recipe into an associated abstract recipe, the associated abstract recipe comprising a data structure that comprises an ingredients list in which each ingredient is identified by its associated ingredient identifier from the ingredient database and attributed a quantity, and a recipe sequence, wherein the recipe sequence identifies individual steps in the user-comprehensible recipe, wherein each step in the sequence is associated with an action identifier from the action database identifying one or more of at least one of the actions to be performed in the individual step, an ingredient id with an associated measure for the step, one or more container ids, an appliance id with associated appliance parameters, or at least one of multimedia and virtual reality data that illustrate a performance of one of the actions;
> store a reference to the user-comprehensible recipe and the associated abstract recipe in a recipe database;
> provide a graphical user interface to allow a user to at least one of select a recommended one of the recipes stored in the recipe database or to select one of the user-comprehensible recipes from search results after performing a recipe search against the recipe database with appropriate search criteria;
> receive the selection of one of the user-comprehensible recipes from the user;
> receive a desired output measure from the user;
> retrieve in response to the selected user comprehensive recipe the associated abstract recipe as an input;
> use the received desired output measure to scale the associated measure for each ingredient;
> compare the action identifiers associated with the abstract recipe with action identifiers associated with the kitchen appliances to identify the kitchen appliances which may be employed in individual steps of the sequence;
> employ the scaled ingredients and one or more selected appliances to transform the abstract recipe into a functional recipe which details the ingredients by their ingredient id and scaled associated measure and a sequence of steps to be followed including associating as required one or more selected appliances with one or more individual steps in the sequence;
> convert the functional recipe into a tangible recipe comprising a user-comprehensible list of ingredients with appropriate measures for the user, the tangible recipe comprising a user-comprehensible series of sequential steps, wherein the tangible recipe is presented on the user interface; and
> interface to at least one networked device connected to the network, wherein the networked device operates based on the tangible recipe.

20. A client-server arrangement comprising a server and a client device for use with connected kitchen appliances, comprising:

> a server comprising:
> an ingredient database, storing information for a plurality of ingredients and identifying each ingredient with a unique ingredient identifier;
> an action database storing a plurality of actions performable by at least one of a user or one of a plurality of kitchen appliances and identifying each action with a unique action identifier;
> an appliance database storing information for a plurality of the kitchen appliances, each of the kitchen appliances connected or not connected to a network, and identifying each appliance with a unique appliance identifier, the appliance database also associating each kitchen appliance with one or more action identifiers from the action database, each associated action identifier identifying the action for which the kitchen appliance may be used;
> an ingestion engine for receiving one of a plurality of user-comprehensible recipes and converting the user-comprehensible recipe into an associated abstract recipe, the associated abstract recipe comprising a data structure that comprises an ingredients list in which each ingredient is identified by its associated ingredient identifier from the ingredient database and attributed a quantity, and a recipe sequence, wherein the recipe sequence identifies individual steps in the user-comprehensible recipe, wherein each step in the sequence is associated with the action identifier from the action database identifying the action to be performed in the individual step; and
> a recipe database storing a reference to the user-comprehensible recipe and the associated abstract recipe; and
> an application programming interface to allow at least one networked device connected to the network to operate based on a tangible recipe; and
> a client device comprising:
> a user interface providing a graphical user interface allowing a user to at least one of select a recommended one of the user-comprehensible recipes stored in the recipe database, or to select one of the user-comprehensible recipes from search results after performing a recipe search against the recipe database with appropriate search criteria, and to provide a desired output measure;
> a transformation engine responsive to the user selection of the user-comprehensible recipe, the transformation engine retrieving the associated abstract recipe from the server as an input, the transformation engine using the desired output measure to scale the associated measure for each ingredient, comparing the action identifiers associated with the abstract recipe with the action identifiers associated with the kitchen appliances to identify appliances which may be employed in the individual steps of the sequence, and employing the scaled ingredients and one or more selected appliances to transform the abstract recipe into a functional recipe which details the ingredients by their ingredient id and scaled associated measure and a sequence of steps to be followed including associating as required one or more selected appliances with one or more individual steps in the sequence; and a tangible recipe generation accepting the functional recipe and converting the functional recipe into the tangible recipe comprising a user-comprehensible list of ingredients with appropriate measures for the user, the tangible recipe comprising a user-comprehensible series of sequential steps, wherein the tangible recipe generation is configured to present the tangible recipe on the user interface.

\* \* \* \* \*